(12) United States Patent
Cunningham

(10) Patent No.: US 12,047,486 B2
(45) Date of Patent: Jul. 23, 2024

(54) BLOCK CIPHER ENCRYPTION PIPELINE

(71) Applicant: Graphcore Limited, Bristol (GB)

(72) Inventor: Graham Cunningham, Chippenham (GB)

(73) Assignee: GRAPHCORE LIMITED, Bristol (GB)

( * ) Notice: Subject to any disclaimer, the term of this patent is extended or adjusted under 35 U.S.C. 154(b) by 230 days.

(21) Appl. No.: 17/359,066

(22) Filed: Jun. 25, 2021

(65) Prior Publication Data

US 2022/0416996 A1    Dec. 29, 2022

(51) Int. Cl.
*H04L 9/06* (2006.01)

(52) U.S. Cl.
CPC .......... *H04L 9/0618* (2013.01); *H04L 9/0643* (2013.01)

(58) Field of Classification Search
CPC .... H04L 9/0618; H04L 9/0643; H04L 9/0637
See application file for complete search history.

(56) References Cited

U.S. PATENT DOCUMENTS

| | | | | |
|---|---|---|---|---|
| 5,220,565 A * | 6/1993 | Wilson | ................ | H03G 3/344 455/701 |
| 2006/0041938 A1* | 2/2006 | Ali | ................ | G06Q 20/40975 726/14 |
| 2008/0222368 A1* | 9/2008 | Gehrmann | ............ | G06F 21/572 711/E12.001 |
| 2010/0071055 A1* | 3/2010 | Kaniz | ................ | H04L 63/0485 726/14 |
| 2012/0008768 A1* | 1/2012 | Mundra | ................ | H04L 9/0637 380/28 |
| 2017/0372092 A1* | 12/2017 | Dohi | ................... | G06F 21/6227 |
| 2020/0169383 A1* | 5/2020 | Durham | ................ | H04L 9/0637 |
| 2022/0021517 A1* | 1/2022 | Ghosh | ................ | H04L 9/0637 |
| 2022/0350932 A1* | 11/2022 | Huang | ................ | H04L 9/0869 |

* cited by examiner

*Primary Examiner* — Carl G Colin
*Assistant Examiner* — Hany S. Gadalla
(74) *Attorney, Agent, or Firm* — HAYNES AND BOONE, LLP

(57) ABSTRACT

The device implements a processing pipeline having distinct circuitry for performing encryption/decryption operations and authentication operations and having state stores associated with the respective operations. The state stores store state associated with a given encryption frame, enabling the respective operations to be performed when blocks of data reach that stage in the pipeline. Due to the complexity of operations in a block cipher encryption scheme, the pipeline is deep, which provide the possibility for processing multiple data packets at any one time. The provision of the state stores at the stages in the pipeline at which they are required prevents stalling when a new data packet is received.

21 Claims, 23 Drawing Sheets

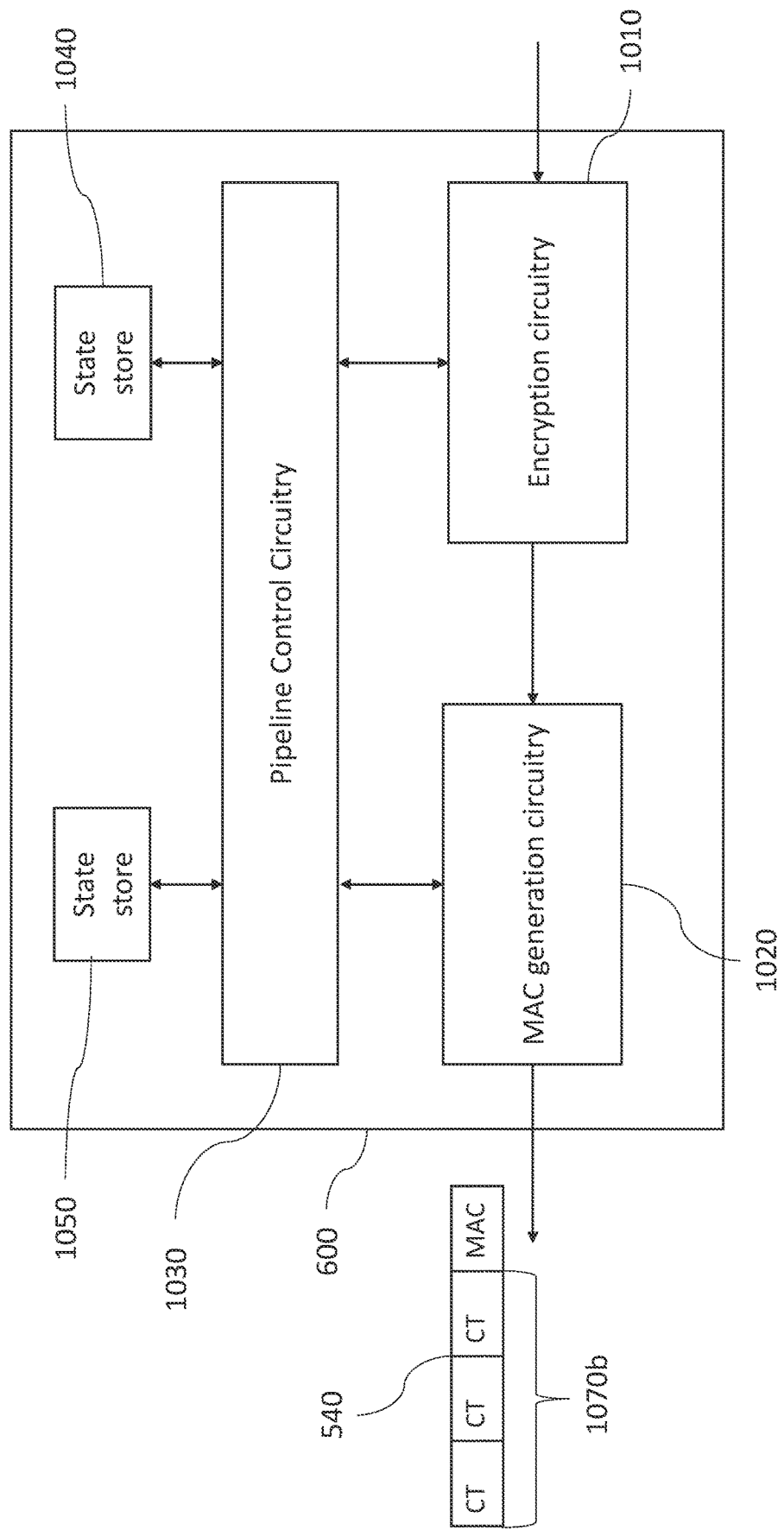

BLOCK CIPHER ENCRYPTION PIPELINE

TECHNICAL FIELD

The present disclosure relates to a device for performing operations to implement a block cipher encryption scheme, and in particular, to a device implementing a processing pipeline for implementing such a scheme.

BACKGROUND

In the context of processing data for complex or high volume applications, a work accelerator may be a subsystem to which processing of certain data is offloaded from a host system. Such a work accelerator may include specialised hardware for performing specific types of processing of workloads.

In order to supply input data for processing by the accelerator subsystem, that data may first be stored in a storage external to the accelerator subsystem, with the accelerator subsystem being operable to issue read requests to obtain the data from the external storage for processing. When the accelerator has finished processing a certain amount of data, the accelerator may then issue write requests to write the results to the storage external to the accelerator subsystem.

Although the accelerator subsystem is secure and trusted, the storage external to the accelerator may be untrusted. Therefore, in order to prevent the input data and the results held in the external storage being interpretable by malicious third parties, it is desirable to encrypt the data held in the external storage, with that data being decrypted before being processed by the accelerator subsystem.

One type of encryption algorithm that is useful for the encryption of large amounts of data is a block cipher encryption algorithm, which operates on fixed sized groups of data, referred to as blocks. The encryption algorithm operates on unencrypted blocks of data, referred to as plaintext, to produce encrypted blocks of data, referred to as ciphertext. A corresponding decryption algorithm may operate on ciphertext blocks to produce plaintext blocks. As part of the encryption algorithm, authentication operations may be performed to generate a message authentication code over one or more blocks of the ciphertext. A group of blocks (either ciphertext blocks or plaintext blocks) over which the message authentication code (MAC) is generated is referred to as an encryption frame.

A device may be provided for performing operations to implement a block cipher encryption scheme, either by performing encryption operations and generating a message authentication code and/or by performing decryption operations and checking a MAC held in the data packets.

SUMMARY

Therefore, a device may receive plaintext blocks of an encryption frame in a plurality of data packets, and be required to perform both encryption processing of the plaintext blocks in the encryption frame and authentication processing to generate a MAC for the frame. It is challenging to provide an appropriate device for this purpose that reduces or eliminates stalling when the processing of one data packet depends on the results of processing of a previous data packet.

According to a first aspect, there is provided a device for performing operations to implement a block cipher encryption scheme for the encryption of data in data packets received at the device, the device providing a processing pipeline comprising: a first state store for storing state information for performing encryption operations to produce ciphertext blocks from plaintext blocks received in the data packets; a second state store for storing state information for performing authentication operations for generating message authentication codes; first processing circuitry configured to perform the encryption operations; second processing circuitry configured to perform the authentication operations; and pipeline control circuitry configured to: in response to receipt at the device of a first data packet belonging to a first encryption frame, provide one or more of the plaintext blocks received in the first data packet to the first processing circuitry for encryption processing to produce one or more generated ciphertext blocks; update the state information held in the first state store with state generated by the encryption processing of the one or more of the plaintext blocks in the first data packet; provide the one or more generated ciphertext blocks to the second processing circuitry for authentication processing; update state information held in the second state store with state generated by the authentication processing of the one or more of the generated ciphertext blocks; in response to receipt at the device of a second data packet belonging to the first encryption frame, provide one or more plaintext blocks received in the second data packet to the first processing circuitry for encryption processing using the state generated by the encryption processing of the one or more of the plaintext blocks in the first data packet loaded from the first state store, wherein at feast some of the authentication processing performed with respect to the one or more generated ciphertext blocks is performed simultaneously to the encryption processing of the one or more of the plaintext blocks in the second data packet.

The device implements a processing pipeline having distinct circuitry for performing encryption operations and authentication operations and having state stores associated with the respective operations. The state stores store state associated with a given encryption frame, enabling the respective operations to be performed when blocks of data reach that stage in the pipeline. Due to the complexity of operations in a block cipher encryption scheme, the pipeline is deep, which provide the possibility for processing multiple data packets at any one time. The provision of the state stores at the stages in the pipeline at which they are required prevents stalling when a new data packet is received. An earlier data packet, which has already been subject to the encryption processing, may be subject to the authentication processing by the second circuitry. Meanwhile, the new data packet undergoes encryption processing using the state generated when the encryption processing was performed for the earlier data packet. In this way, the device may simultaneously process multiple data packets belonging to an encryption frame without stalling.

According to a second aspect, there is provided a device for performing operations to implement a block cipher encryption scheme for the decryption of data in data packets received at the device, the device providing a processing pipeline comprising: a first state store for storing state information for performing operations for decryption of ciphertext blocks received in the data packets; a second state store for storing state information for performing authentication operations to generate message authentication codes; first processing circuitry configured to perform at least some of the operations for decryption; second processing circuitry configured to perform the authentication operations; pipeline control circuitry configured to: in response to receipt at the device of a first data packet belonging to a first encryption frame, cause the first processing circuitry to perform the at least some of the operations for decryption with respect to the first data packet; update the state information held in the first state store with state generated by the at least some of the operations for decryption performed with respect to the first data packet; provide one or more of the ciphertext blocks in the first data packet to the second processing circuitry for authentication processing; update the state information held in the second state store with state generated by the authentication processing of the one or more of the ciphertext blocks; in response to receipt at the device of a second data packet belonging to the first encryption frame, cause the first processing circuitry to perform the at least some of the operations for decryption with respect to the second data packet using the state generated by the at least some of the operations for decryption performed with respect to the first data packet, wherein the at least some of the operations for decryption performed with respect to the second data packet are performed simultaneously with the authentication processing performed for the one or more of ciphertext blocks in the first data packet.

The device implements a processing pipeline having distinct circuitry for performing encryption operations and authentication operations and having state stores associated with the respective operations. The state stores store state associated with a given encryption frame, enabling the respective operations to be performed when blocks of data reach that stage in the pipeline. Due to the complexity of operations in a block cipher encryption scheme, the pipeline is deep, which provide the possibility for processing multiple data packets at any one time. The provision of the state stores at the stages in the pipeline at which they are required prevents stalling when a new data packet is received. An earlier data packet, which has already been subject to the encryption processing, may be subject to the authentication processing by the second circuitry. Meanwhile, the new data packet undergoes encryption processing using the state generated when the encryption processing was performed for the earlier data packet. In this way, the device may simultaneously process multiple data packets belonging to an encryption frame without stalling.

BRIEF DESCRIPTION OF DRAWINGS

For a better understanding of the present disclosure and to show how the same may be carried into effect reference will now be made by way of example to the following drawings.

FIG. 16B illustrates encryption processing of data extracted from a first data packet and reception of a second data packet at the encryption device;

DETAILED DESCRIPTION

The present disclosure relates to a device for implementing a block cipher encryption scheme. Such a device may be used to interface a processing unit with an external storage, so as to encrypt data written by the processing unit to the external storage and to decrypt data read from the external storage by the processing unit. Example embodiments are described in which the device is used to interface a multi-tile processing unit with an external storage in this way. However, it would be appreciated that not all embodiments are so limited, and in other embodiments the device may be used to interface different types of entities.

An example multi-tile processing unit 2 is described with reference to FIG. 1. This example such processing unit 2 may take the form of the IPU (Intelligence Processing Unit), so named to denote its adaptivity to machine learning applications. The IPU is described in more detail in U.S. application Ser. No. 16/276,834, which is incorporated by reference.

Figure 1:
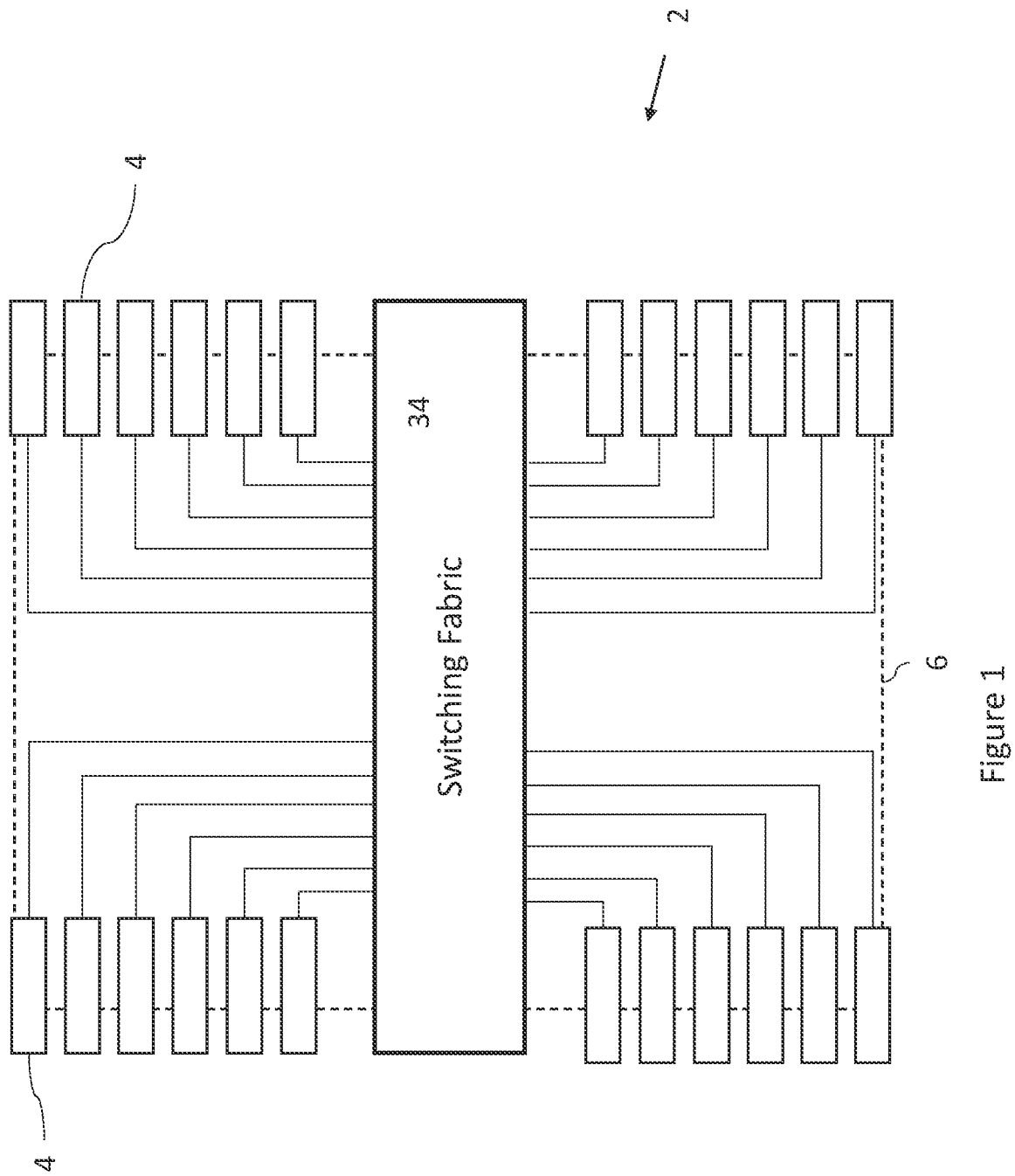
FIG. 1 illustrates an example of a processing unit comprising a plurality of processor tiles.

FIG. 1 illustrates schematically the architecture of the example processing unit 2. The processing unit 2 comprises an array 6 of multiple processor tiles 4 and an interconnect 34 connecting between the tiles 4. The processing unit 2 may be implemented alone or as one of multiple dies packaged in the same IC package. The interconnect 34 may also be referred to herein as the "exchange fabric" 34, as it enables the tiles 4 to exchange data with one another. Each tile 4 comprises a respective instance of an execution unit and memory. For instance, by way of illustration, the processing unit 2 may comprise of the order of hundreds of tiles 4, or even over a thousand. For completeness, note also that an "array" as referred to herein does not necessarily imply any particular number of dimensions or physical layout of the tiles 4. Each tile 4 has its own local memory (described later). The tiles 4 do not share memory.

The processing unit 2 receives work from a host (not shown), which is connected to the processing unit 2 via one of the chip-to-host links implemented on an integrated circuit (i.e. chip) to which the processing unit 2 belongs. The work takes the form of input data to be processed by the processing unit 2. When providing the work, the host may access a computer, which is architected as a single processing unit 2 or a group of multiple interconnected processing units 2, depending on the workload from the host application.

The processing unit 2 comprises a switching fabric 34 to which all tiles 4 and links are connected by sets of connection wires, the switching fabric being stateless, i.e. having no program visible state. Each set of connection wires is fixed end to end. In this embodiment, a set comprises 32 data wires plus control wires, e.g. a valid bit. Each set can carry a 32-bit data packet, but note herein that the word "packet" denotes a set of bits representing a datum (sometimes referred to herein as a data item), perhaps with one or more valid bit. Each set of connection wires is pipelined and comprises a series of temporary stores, e.g. latches or flip flops, which hold datum for a clock cycle before releasing it to the next store. Time of travel along each wire is determined by these temporary stores, each one using up a clock cycle of time in a path between any two points. In this way, data exchange between tiles 4 may be conducted on a time deterministic basis.

By sending data between tiles 4 in a time deterministic manner, the "packets" may be sent without destination identifiers, which would permit an intended recipient to be uniquely identified. The packets may, however, include headers indicating at least one direction of travel through the switching fabric 34. The time deterministic exchange of data packets is explained in more detail in earlier application U.S. patent application Ser. No. 15/886,315, which is incorporated by reference.

The tiles 4 are also enabled to send data to entities (e.g. to the host) by transmitting data packets having headers containing addresses that are used to route the data packets to the host. This external exchange of data between is done in a non-time deterministic manner as described in our earlier application U.S. application Ser. No. 15/886,065.

Figure 2:
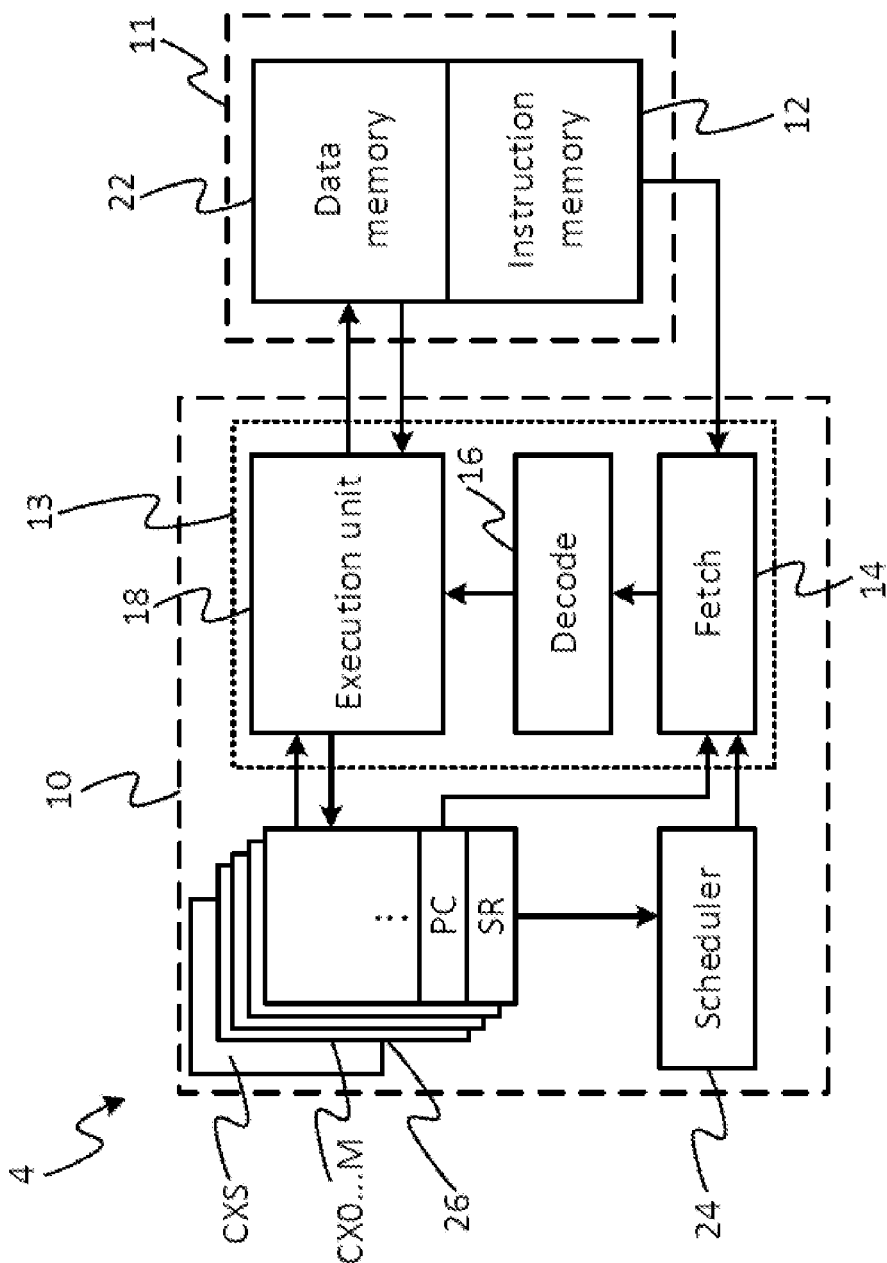
FIG. 2 illustrates an example of a processor tile.

Each of the processor tiles 4 comprises processing circuitry and memory. In some example embodiments, the processing circuitry is a multi-threaded processor 10. FIG. 2 illustrates an example of a processor tile 4 in accordance with embodiments of the present disclosure. The processor tile 4 comprises a multi-threaded processor 10 in the form of a barrel-threaded processor 10, and a local memory 11 (i.e. on the same tile in the case of a multi-tile array, or same chip in the case of a single-processor chip). A barrel-threaded processor 10 is a type of multi-threaded processor 10 in which the execution time of the pipeline is divided into a repeating sequence of interleaved time slots, each of which can be owned by a given thread. This will be discussed in more detail shortly. The memory 11 comprises an instruction memory 12 and a data memory 22 (which may be implemented in different addressable memory unit or different regions of the same addressable memory unit). The instruction memory 12 stores machine code to be executed by the processing unit 10, whilst the data memory 22 stores both data to be operated on by the executed code and data output by the executed code (e.g. as a result of such operations).

The memory 12 stores a variety of different threads of a program, each thread comprising a respective sequence of instructions for performing a certain task or tasks. Note that an instruction as referred to herein means a machine code instruction, i.e. an instance of one of the fundamental instructions of the processor's instruction set, consisting of a single opcode and zero or more operands.

Within the processor 10, multiple different ones of the threads m the instruction memory 12 can be interleaved through a single execution pipeline 13 (though typically only a subset of the total threads stored in the instruction memory can be interleaved at any given point in the overall program). The multi-threaded processor 10 comprises: a plurality of context register files 26 each arranged to represent the state (context) of a different respective one of the threads to be executed concurrently; a shared execution pipeline 13 that is common to the concurrently executed threads; and a scheduler 24 for scheduling the concurrent threads for execution through the shared pipeline in an interleaved manner, preferably in a round robin manner. The processor 10 is connected to a shared instruction memory 12 common to the plurality of threads, and a shared data memory 22 that is again common to the plurality of threads.

The execution pipeline 13 comprises a fetch stage 14, a decode stage 16, and an execution stage 18 comprising an execution unit which may perform arithmetic and logical operations, address calculations, load and store operations, and other operations, as defined by the instruction set architecture. Each of the context register files 26 comprises a respective set of registers for representing the program state of a respective thread.

It is desirable in some circumstances to provide for the confidentiality of data that is provided for execution on a processing unit 2. Typically, confidentiality is provided by encryption of data.

Figure 3:
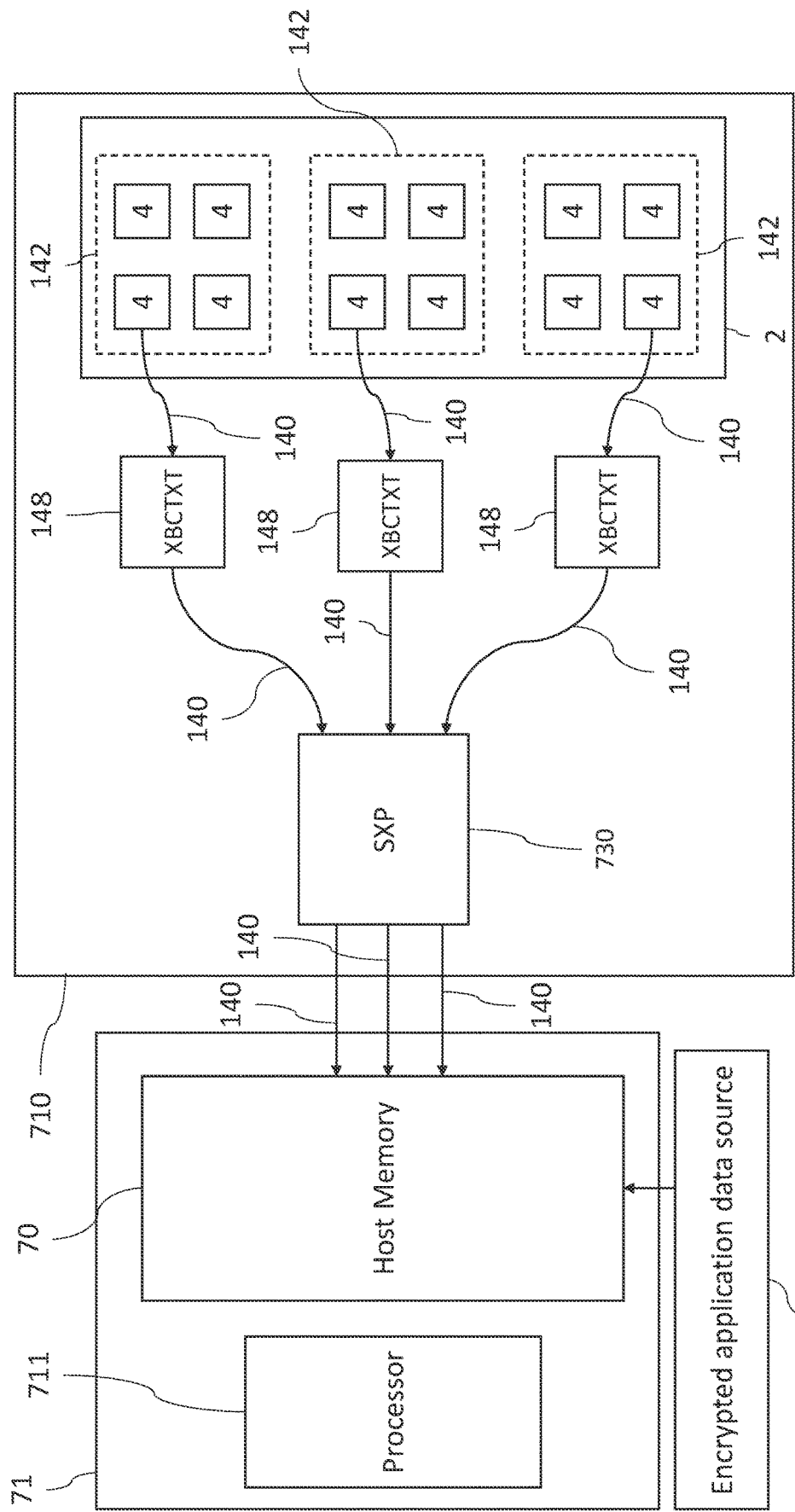
FIG. 3 illustrates an arrangement for sending data packets from tiles to a host.

Reference is made to FIG. 3, which illustrates an example of an integrated circuit (i.e. chip) 710 incorporating a secure exchange pipeline (SXP) 730. The chip 710 include a processing unit 2. The processing unit 2 is a multi-tile processing unit 2 comprising tile processors 4 as discussed. The tiles 4 are configured to read and write data from a host memory 70 of a host system 71 external to the device 710. The host system 71 is untrusted and is unable to decrypt the application data stored in memory 70.

The host system 71 is connected to a data source 720. The application data source 720 is a further data processing system that is configured to communicate with the processing unit 2 via the host system 71. The application data source 720 provides the compiled executable code that executes on the processing unit 2 by writing this code in encrypted form to the host memory 70. It is also the data source 720, which provides encrypted application data for processing by the processing unit 2 by storing that data in the host memory 70. This data is read by the tiles 4 of the processing unit 2. Additionally, the tiles 4 write their results of processing to the host memory 70. Since the host system 71 is untrusted, the application data and results are encrypted before being sent through the host 71.

The one or more symmetric keys, which are required to encrypt and decrypt the data, are shared between the application data source 720 and the integrated circuit 710.

FIG. 3 illustrates how different tiles 4 may write data to host memory 70. To do so, tiles 4 issue write requests 140 to write data to host memory 70. Each write request 140 comprises an address in memory 70 at which data is to be written. Each tile 4 issues a plurality of write requests that belong to a single encryption frame. Each such encryption frame comprises a plurality of plaintext blocks for writing to the host memory.

Each tile 4 issues a plurality of write requests 140 to an exchange block context 148 with which it is associated. The exchange block context 148 comprises circuitry for interfacing an associated subset 142 of tiles 4 with entities (e.g. the host 71) external to the chip 710. The write request 140 is transmitted from the tile 4 in a first packet format (referred to as the Tlink format) and received at an exchange block context 148 in that format. The exchange block context 148 converts the write request 140 to a second packet format (referred to as an Elink packet format). When in the Elink packet format, the packet is suitable for transmission to other components of the integrated circuit 710 outside of the processing unit 2.

The write request 140 is passed to the SXP encryption hardware 730 that is configured to implement the encryption algorithm. The SXP 730 performs encryption of data written by the tiles 4 to the host memory 70, The SXP 730 may perform the encryption operations according to a block cipher encryption scheme, such as the Advanced Encryption Standard (AES). The SXP 730 also performs authentication operations to generate a MAC for writing to the host memory 70. The SXP 730 generates the MAC using all of the plaintext blocks in the encryption frame.

The write requests 140 are sent via the SXP 730 to the host 71. When the data packets are transmitted to the host 71, the packets may be converted to a third format (e.g. PCIe or Ethernet) before being transmitted externally to the chip 710. The host 71 processes these request to service them by causing the relevant data in the write request 140 to be written to the host memory 70.

Figure 4:
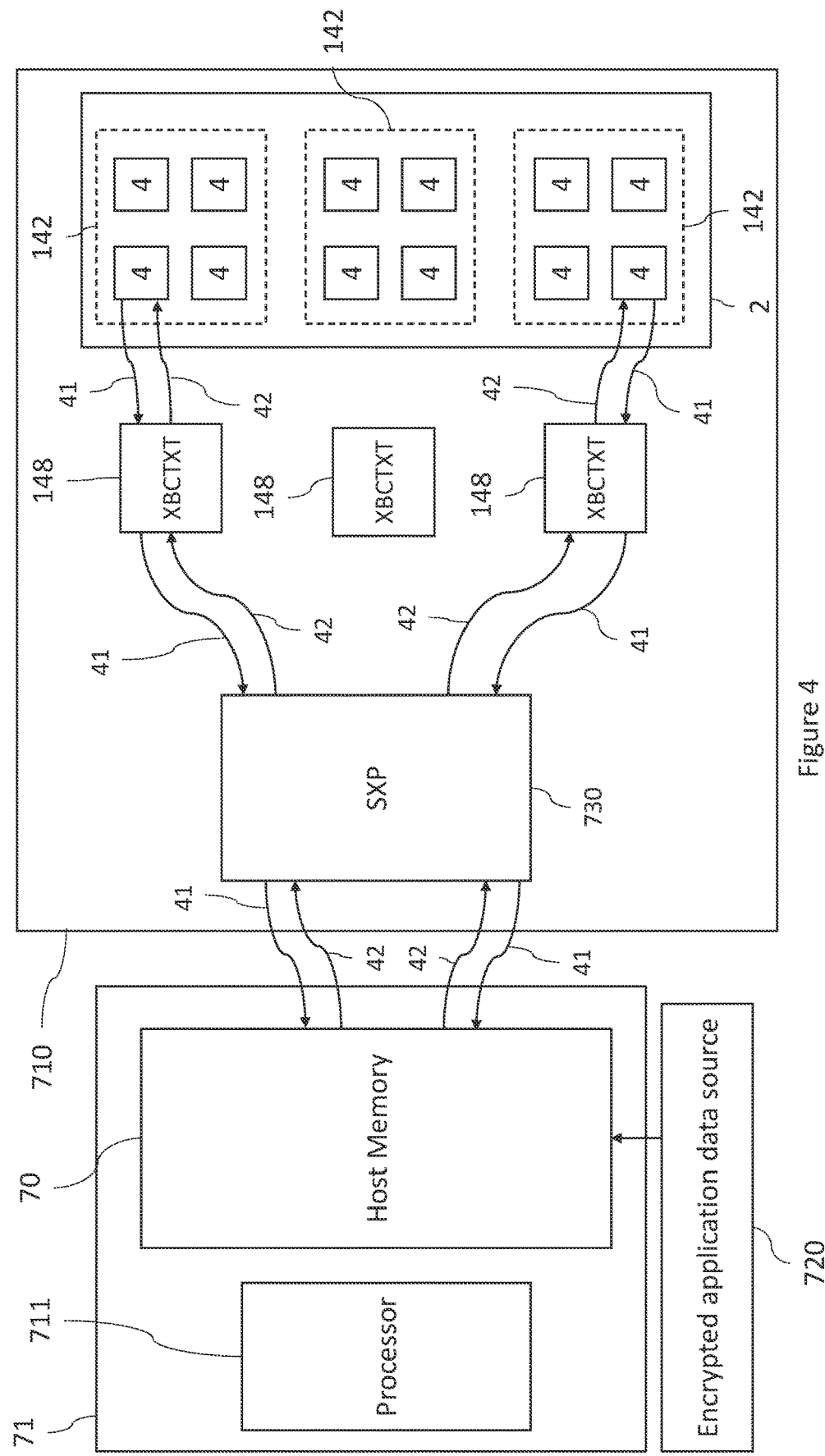
FIG. 4 illustrates an arrangement for reading data from host memory.

FIG. 4 illustrates how different tiles 4 may read data from host memory 70. To do so, tiles 4 issue read requests 41 to read data from the host memory 70. Each read request 41 comprises an address in memory 70 from which data is to be read.

A read request 41 is transmitted from a tile 4 in a first packet format (referred to as the Tlink format) and received at an exchange block context 148 in that format. The exchange block context 148 converts the read request 41 to a second packet format (referred to as an Elink packet format). When in the Elink packet format, the packet is suitable for transmission to other components of the integrated circuit 710 outside of the processing unit 2.

Each read request 41 is delivered to the host 71. The host 71 processes each read request 41 to produce a plurality of read completions 42 that are returned to the tile 4 that issued the corresponding read request 41. Each set of read completions 42 that are returned in response to a read request 41 belong to a single encryption frame. Each encryption frame comprises a MAC and a plurality of ciphertext blocks.

The SXP 730 receives the read completions 42 and performs decryption operations to decrypt ciphertext blocks in the read completions 42. The SXP 730 additionally performs authentication operations to check the MAC in the read completions 42, The SXP 730 then provides the read completions 42 with the decrypted plaintext data to the tile 4 from which the read request 41 originated.

In some embodiments, the separate SXPs 730 may be provided for performing encryption and decryption operations. In other embodiments, a single SXP 730 may perform both encryption operations and decryption operations.

To perform the encryption and decryption of data, the SXP 730 implements a block cipher encryption algorithm.

As noted, block cipher encryption operates on fixed sized groups of data, referred to as blocks. These blocks are transported in encryption frames, which comprise one or more data packets over which the blocks are spread.

There are different types of block cipher modes of operation, and some of these make use of a unique set of data referred to as an initialisation vector. The initialisation vector ensures that different encrypted data is produced from the same unencrypted data by the encryption algorithm.

This has the advantage of preventing an attacker from being able to identify patterns in encrypted data.

Figure 5:
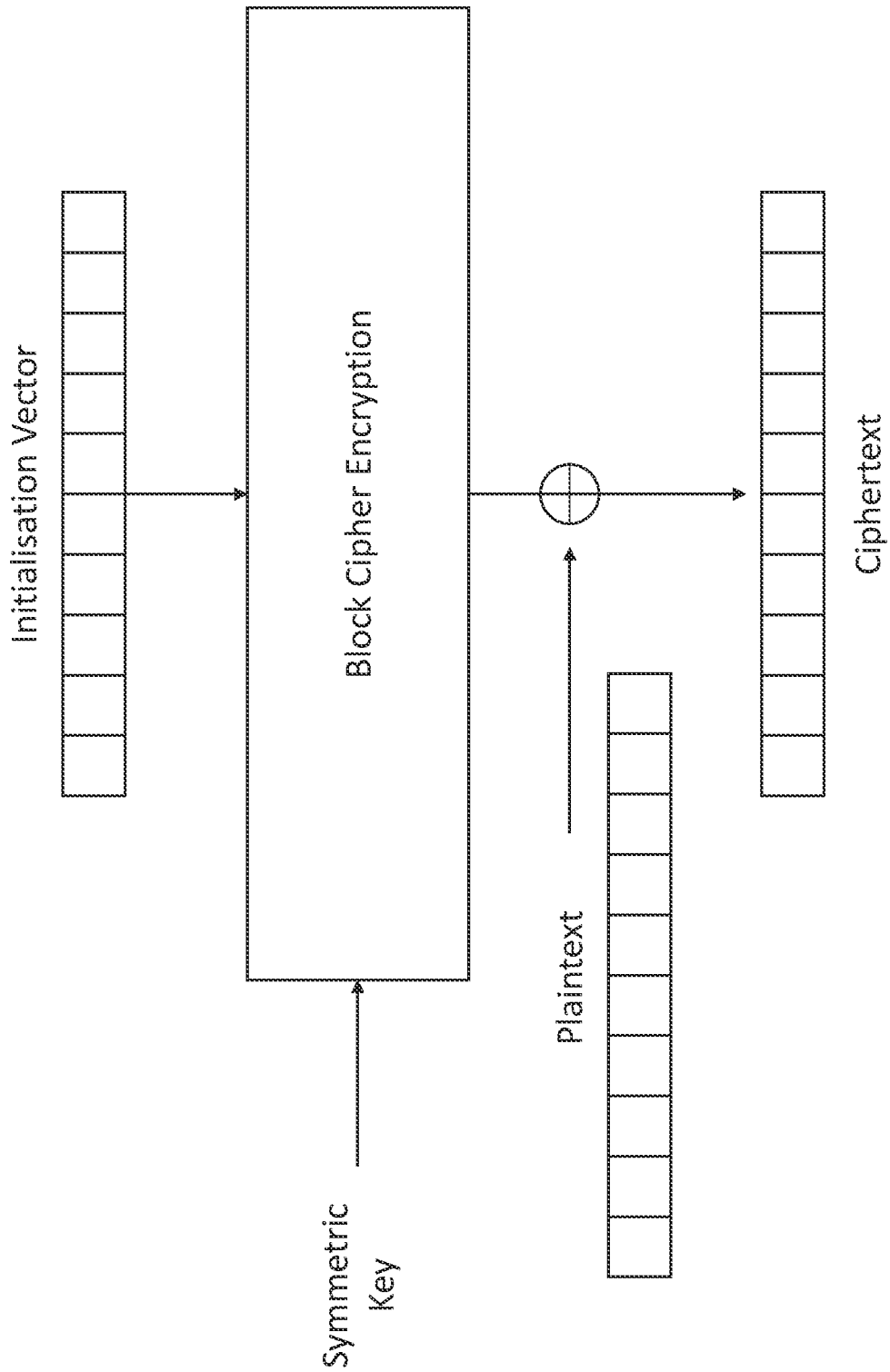
FIG. 5 illustrates a block cipher encryption scheme.

An initialisation vector may be applied in different ways to produce encrypted data. Reference is made to FIG. 5, which illustrates one example of the use of an initialisation vector that is used in example embodiments. A block of unencrypted data is referred to as a block of plaintext, whereas a block of encrypted data is referred to as a block of ciphertext. As may be observed from FIG. 5, the encryption key is not directly applied to the plaintext. Rather, it is the initialisation vector that is encrypted using the encryption key. The encryption key is a symmetric key. The encrypted Initialisation vector is then XORed with the plaintext to produce the ciphertext. A different initialisation vector would be used in this manner to encrypt each different block of plaintext, thereby hiding patterns in the original data.

Because of the symmetry of the operation shown in FIG. 5, the decryption algorithm is the same as the encryption algorithm. In other words, to obtain the plaintext from the ciphertext, the ciphertext is XORed with the encrypted form of the initialisation vector to obtain the plaintext.

Although FIG. 5 shows an example where the encrypted form of the initialisation vector is XORed with the plaintext, in other embodiments, different block cipher modes of operation making use of an initialisation vector may be employed. For example, in another mode of operation, the plaintext may first be XORed with the initialisation vector, with the result of the XOR operation then being encrypted using the encryption key to produce the ciphertext.

There are different types of block cipher encryption by which a key may be applied to encrypt data, such as the initialisation vector, as part of a block cipher, One widely used standard for this purpose is the Advanced Encryption Standard.

Therefore, block ciphers provide for effective encryption of large amounts of data. As well as providing a set of encrypted data, in order to ensure integrity and authentication of data, a sender may also provide, along with the encrypted data, a message authentication code (MAC). The MAC allows a recipient to determine the sender of the data and to detect any changes to the data.

A MAC is produced in dependence upon a set of plaintext or ciphertext blocks. The calculation of the MAC may also be performed in dependence upon each of the initialisation vectors used to perform encryption/decryption processing for each of these blocks. The resulting combination of the blocks and the MAC are transmitted together in one or more packets, which is referred to as an encryption frame. Thus an encryption frame comprises one or more blocks (which may be ciphertext blocks or plaintext blocks) and a MAC, with the MAC being calculated in dependence upon all of the blocks of the encryption frame to which it belongs.

In embodiments of the application, the MAC may be a Galois Message Authentication Code (GMAC) that is calculated in accordance with Galois/Counter Mode (GCM) operation.

Figure 6:
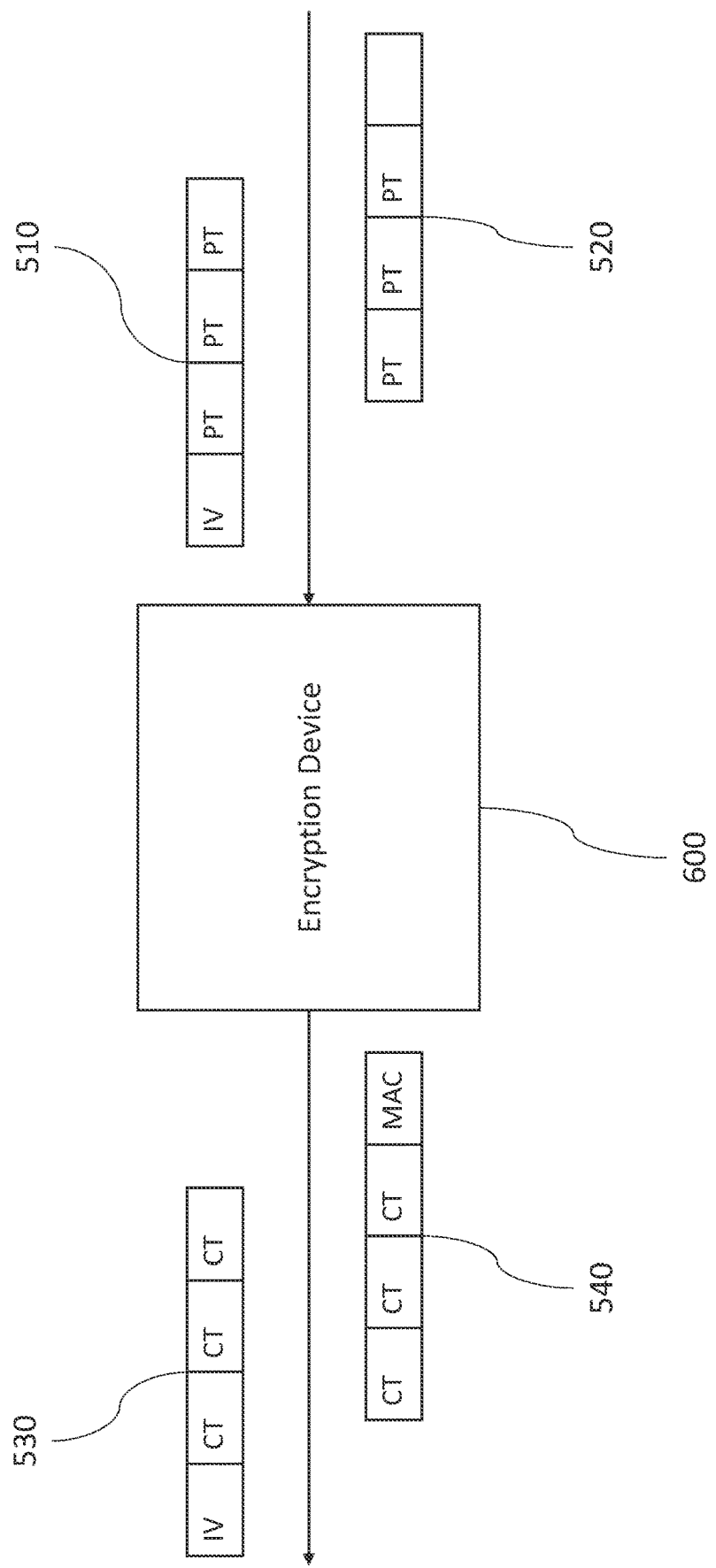
FIG. 6 is an encryption device that receives data packets comprising plaintext and encrypts the plaintext to produce data packet comprising ciphertext.

Reference is made to FIG. 6, which illustrates how write request data packets may be processed by an encryption device 600 according to embodiments. The encryption device 600 may be the SXP 730 shown in FIG. 4. The encryption device 600 may implement the encryption algorithm shown in FIG. 5 to perform the encryption operations described.

A first write request 510 and further write request 520 are shown in FIG. 6. For simplicity, the headers of these packets are not shown. The write requests 510, 520 each comprise a plurality of plaintext blocks, labelled as "PT". The encryption device 600 is configured to determine a single MAC for all of the plaintext blocks in the two write requests 510, 520. Therefore, the write requests 510, 520 together represent a write encryption frame.

Included in the first write request 510 is part of an initialisation vector (shown as IV) used for encrypting each of the plaintext blocks in the write encryption frame. The encryption device 600 is configured to complete the IV using a counter value. Since the IV must be different for each plaintext block that is encrypted, the encryption device 600 increments the counter value for each plaintext block in the write encryption frame. The IV used to encrypt a particular plaintext block is formed by concatenating the counter value associated with the relevant plaintext block with the part of the IV received in the first write request 510.

The further write request 520 contains padded zero bits following the final plaintext in that packet. These bits provide space for the MAC that is to be calculated by the SXP 520 and inserted into the write request 520.

The encryption device 600 upon receiving the first write request 510 encrypts each of the plaintext blocks in that packet to produce corresponding ciphertext blocks. The encryption device 600 also performs authentication operations used for generating the MAC. Since the MAC cannot be finalised until all of the plaintext blocks for the encryption frame have been received at the encryption device 600, these authentication operations comprise generating a partial hash in dependence upon each plaintext block in the first write request 510. The MAC may be a Galois Message Authentication Code (GMAC) that is calculated in accordance with Galois/Counter Mode (GCM) operation. In this case, the partial hash is generated in dependence upon the ciphertext blocks, which are themselves generated using the plaintexts in the data packet 510, and in dependence upon the IIIs used to generate those ciphertext blocks.

When the encryption device 600 receives the write request 520, the encryption device 600 performs the encryption operations to generate the ciphertext blocks for each of the plaintexts in that data packet 520. The IV used to generate each block uses the counter maintained for the write encryption frame that is concatenated with the partial IV in packet 510.

The further write request 520 is provided with one or more bits indicating that it is the last write request for the encryption frame, and therefore the MAC should be finalised and inserted into the packet 520. Therefore, having received all of the plaintexts for the write encryption frame, the encryption device 600 finalises the MAC for the encryption frame. The encryption device 600 generates this MAC using the partial hash calculated when processing the first write request S113 and using the ciphertext blocks produced by encrypting the plaintext in request 520.

The encryption device 600 outputs the processed form of the first write request 530 and the processed form of the second write request 540. These contain the generated ciphertext blocks in place of the plaintext blocks. The second write request 540 contains the MAC. The MAC may be used for authentication of the encryption frame when the encryption frame ciphertext is later read from the memory to which it is to be written by the write requests 530, 540.

Figure 7:
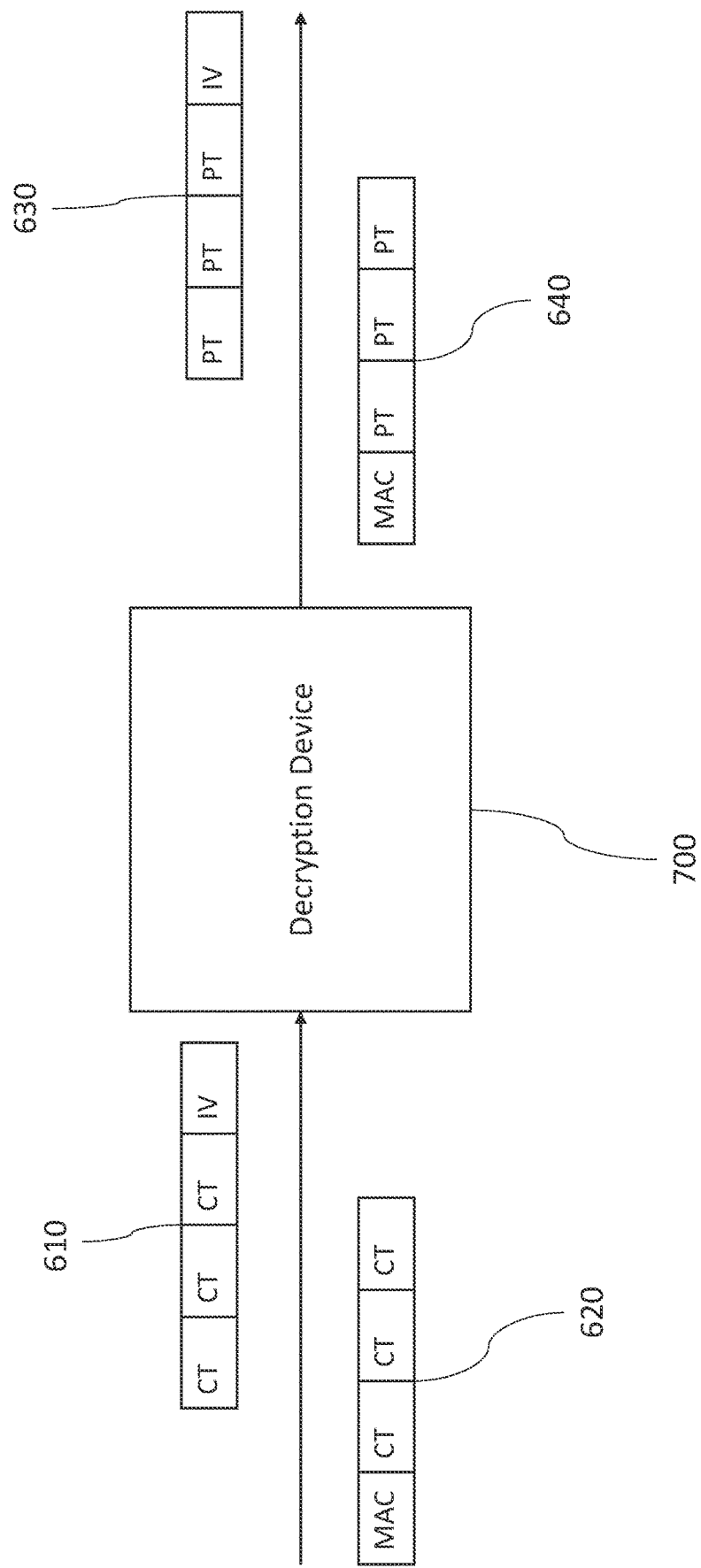
FIG. 7 illustrates a decryption device that receives data packets comprising ciphertext and decrypts the ciphertext to produce data packets comprising plaintext.

Reference is made to FIG. 7, which illustrates how read completion data packets may be processed by a decryption device 700. The decryption device 700 may be the same as the encryption device 600 shown in FIG. 6 or may be implemented in separate hardware. The decryption device 700 may be the SXP 730 shown in FIGS. 3 and 4.

The decryption device 700 receives a first read completion 610 and a second read completion 620. For simplicity, the headers of these packets are not shown. The read completions 610, 620 comprises a plurality of ciphertext blocks, labelled as "CT". The read completion 620 comprises a MAC for all of the ciphertext blocks in the packets 610, 620. Therefore, the read completions 610, 620 together represent a read encryption frame.

Including in the first read completions 610 is part of an initialisation vector (IV) used for decrypting each of the ciphertext blocks in the encryption frame. The decryption device 700 is configured to complete the IV using a counter value. Since the IV must be different for each ciphertext block that is decrypted, the decryption device 700 increments the counter value for each ciphertext block in the encryption frame. The IV used to decrypt a particular ciphertext block is formed by concatenating the counter value associated with the relevant ciphertext block with the part of the IV received in the first write request 610.

The further read completion 620 contains the MAC for the encryption frame. The decryption device 700 is configured to check this MAC in the read completion 620 by recalculating it using the S ciphertext blocks in the packets 610, 620 and comparing the recalculated MAC to the MAC in the read completion 620.

The decryption device 700 upon receiving the first read completion 610 decrypts each of the ciphertext blocks in that packet to produce corresponding plaintext blocks. The decryption device 700 also performs authentication operations used for generating the MAC. Since the MAC cannot be finalised until all of the ciphertext blocks for the encryption frame have been received at the decryption device 700, these authentication operations comprise generating a partial hash in dependence upon each ciphertext block in the first read completion 610. The MAC may be a Galois Message Authentication Code (GMAC) that is calculated in accordance with Galois/Counter Mode (GCM) operation. In this case, the partial hash is generated in dependence upon the ciphertexts in the data packet 610 and in dependence upon the IVs used to generate the corresponding plaintext blocks.

In processing packet 610, the decryption device 700 produces packet 630 containing the decrypted plaintext. The decryption device 700 outputs the packet 630 to its destination.

When the decryption device 700 receives the read completion 620, the decryption device 700 performs the decryption operations to generate the plaintext blocks for each of the ciphertexts in that data packet 620. The IV used to generate each block uses the counter maintained for the read encryption frame that is concatenated with the partial IV in packet 610.

After having received all of the ciphertexts for the encryption frame, the decryption device 700 generates the MAC for the encryption frame. The further read completion 620 is provided with one or more bits indicating that it is the last read completion for the encryption frame, and therefore the MAC should be finalised using the ciphertext in the packet

620. The decryption device 700 generates this MAC using the partial hash calculated when processing the first read completion 610 and using the ciphertext blocks in data packet 620.

Once the decryption device 700 has finalised the MAC, the decryption device 700 checks the calculated MAC against the MAC in packet 620. If the MACs match, the decryption device 700 outputs the processed form of the further read completion 640. If the MACs do not match, the authentication fails and the data packet 640 is not transmitted. The recipient processor may be programmed so as not to process received data (e.g. the data in packet 630) unless it receives all of the data for the encryption frame (e.g. including data of packet 640). Therefore, if the MAC check fails, the recipient processor will not receive all of the data of the encryption frame and, therefore, will not act on any of the data of the encryption frame.

Although FIGS. 5 and 6 both illustrate examples where an encryption frame includes two data packets, in other examples an encryption frame may comprise more than two data packets.

Figure 8:
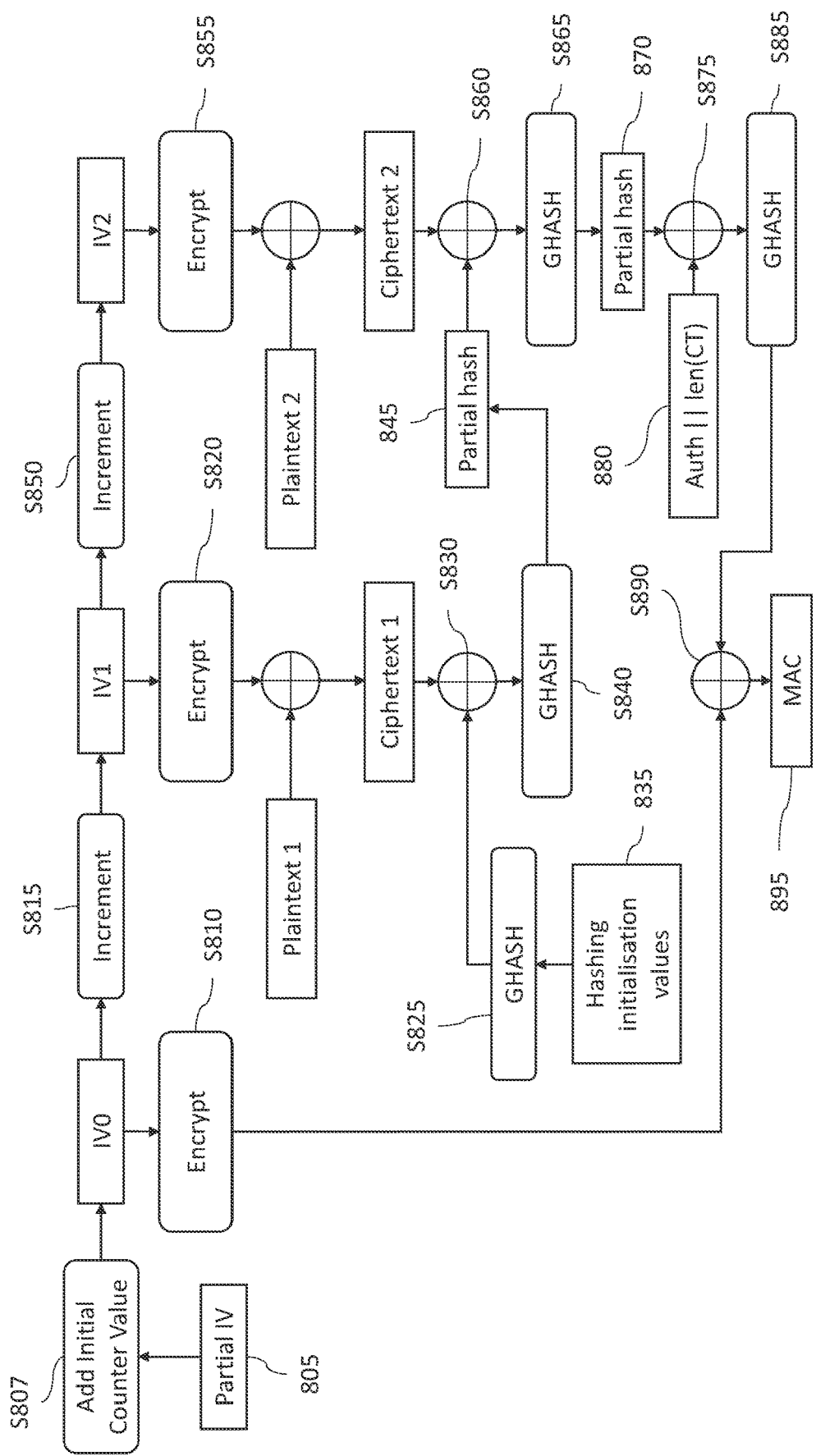
FIG. 8 illustrates an example process for calculating a message authentication code based on received plaintext.

Reference is made to FIG. 8, which illustrates operations performed for generating ciphertext and a MAC according to embodiments of the application. These operations are performed by the encryption device 600 response to receipt of data packets (e.g. data packets 510, 520) comprising plaintext blocks belonging to an encryption frame. For simplification, FIG. 8 shows operations for generating ciphertext and a MAC in the case in which the encryption frame comprises only two plaintext blocks. However, it would be appreciated that the operations can be extended to generating ciphertext and a MAC for more than two plaintext blocks. The reference numerals used to label the steps in FIG. 8 do not indicate the order in which the steps are performed.

The encryption device 600 obtains the partial IV 805 from the received data packets. At S807, the encryption device 600 concatenates the partial IV with an initial counter value to form a full IV. The initial value of the full IV is shown as IV0 in FIG. 8. The value of IV0 is encrypted at S810 to form an encrypted IV value.

The value of IV0 is not directly used in the block cipher encryption scheme shown in FIG. 5, but is first incremented at S815 to form a new IV value (shown as IV' in FIG. 8). IV1 is then encrypted at S820 to form an encrypted IV value. The encrypted IV value generated at S820 is XORed with the first plaintext block (shown as plaintext 1) to form the first ciphertext block (shown as ciphertext 1).

Ciphertext 1 is XORed at S830 with an initial partial hash value. The initial partial hash value is provided by taking a set of initialisation values 835 for the hash and providing them to the hashing function (shown as S825). The hashing initialisation values 835 may be generated by applying the encryption function used to encrypt the IV values to a string of zeros.

The output of the XOR operation at S830 is provided to the hashing function at S840. The hashing function performed at S840 is the same as the hashing function performed at S825. The output of the hashing operation at S840 provides a partial hash value 845. As will be described, this partial hash value 845 may be stored as state information for calculating a MAC.

In order to generate the next ciphertext, the value of IV1 is incremented to provide a further updated value for the IV (shown as IV2) in FIG. 8. IV2 is encrypted at S855. The encrypted value of IV2 is then is XORed with the second plaintext block (shown as plaintext 2) to form the second ciphertext block (shown as ciphertext 2).

Ciphertext 2 is XORed at S860 with the partial hash value 845. The hash function is then applied at S865 to the output of the XOR operation S860 to generate a new partial hash value at 870. The new partial hash value 870 is then XORed at S875 with a length value 880. The length value 880 is the result of concatenating a string of authentication bits (with may be a string of zeros) with a representation of the length of the plaintext/ciphertext. The length value 880 has the same length as the partial hash 870, and the same length as the plaintext and ciphertext. For example, in the case that the plaintext and ciphertext are both 128 bits, the length value 880 is 128 bits, 64 of which belong to the string of authentication bits (which may be 64 zero bits) and 64 of which provide a 64 bit representation of the length of the plaintext/ciphertext.

At S885, the output of the XOR operation at S875 is subject to the hash function. At S890, the output of the hash function at S885 is XORed with the encrypted form of IV0 (which is produced at operation S810). The results of the XOR operation at S890 is the MAC 895 for the encryption frame.

In order to perform encryption and authentication operations for encryption frames comprising more than two plaintext blocks, the process shown in FIG. 8 may be extended by again incrementing and encrypting the IV and using this to generate a new ciphertext. The partial hash 870 is then XORed with the hashed form of the new ciphertext in the same manner partial hash 845 was XORed with ciphertext 2.

Figure 9:
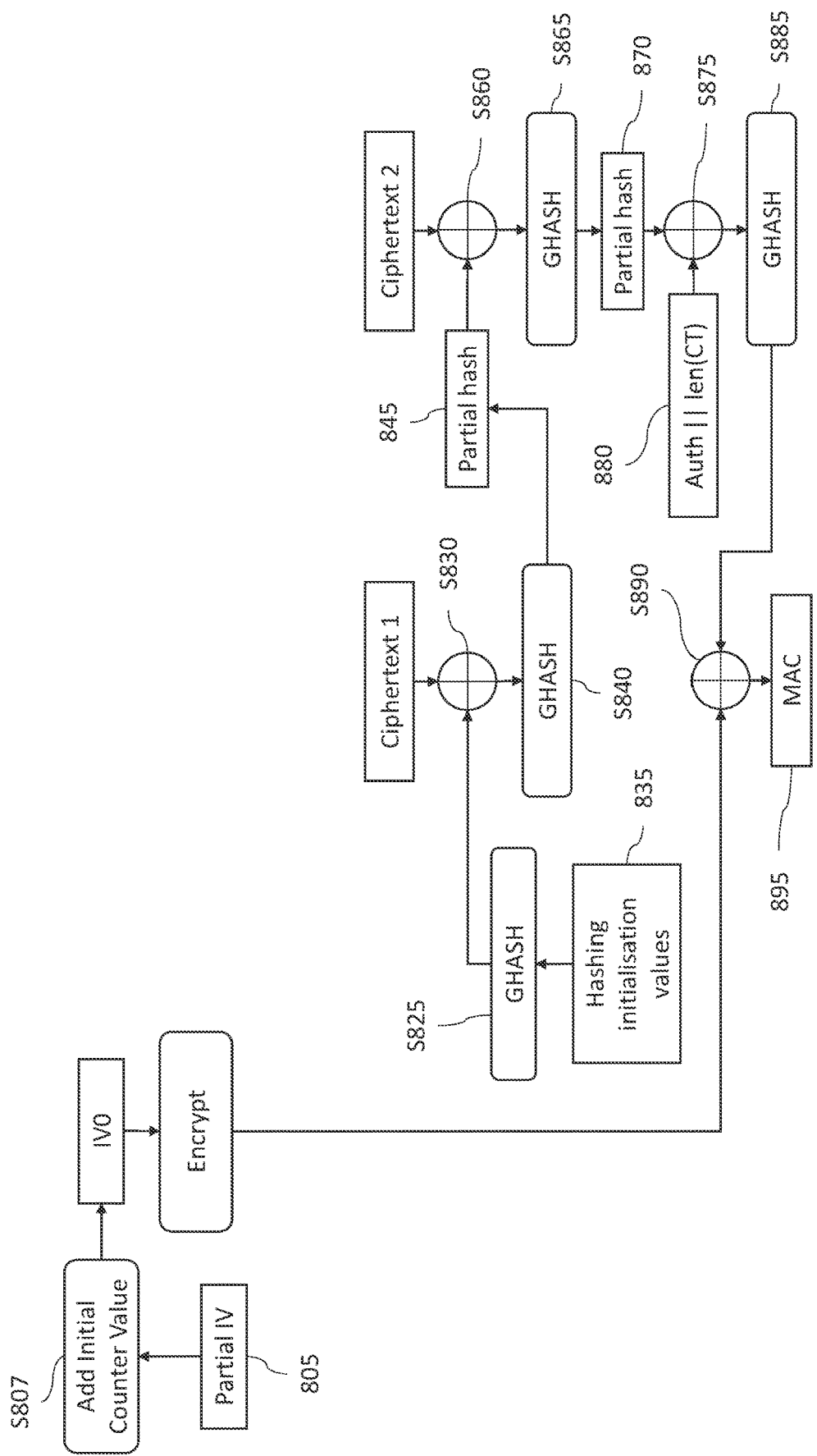
FIG. 9 illustrates an example process for calculating a message authentication code based on received ciphertext.

Reference is made to FIG. 9, which illustrates operations performed by the decryption device 700 for generating a MAC according to embodiments of the application. These operations are performed by the decryption device 700 response to receipt of data packets (e.g. data packets 610, 620) comprising ciphertext blocks belonging to an encryption frame. For simplification, FIG. 9 shows operations for generating the MAC in the case in which the encryption frame comprises only two ciphertext blocks. However, it would be appreciated that the operations can be extended to generating a MAC for an encryption frame comprising more than two blocks. This MAC is generated to check the MAC that is received in a data packet at the decryption device 700.

The steps and items of data in FIG. 9 that are the same as the steps shown in FIG. 8 and are labelled with the same reference numerals. Unlike in FIG. 8, it is not necessary to perform encryption operations to generate the ciphertext prior to determining the MAC 895, since the ciphertext blocks are included in the data packets received at the decryption device 700. A first ciphertext block (shown as ciphertext 1) received in a data packet is subject to the XOR operation at S830. A second ciphertext block (shown as ciphertext 2) received in a data packet is subject to the XOR operation at S860.

The microarchitecture of the encryption device 600 and decryption device 700 will now be described. The processing pipeline provided in these devices 600, 700 enables the devices to implement a block cipher encryption scheme to process multiple data packets simultaneously without stalling.

Firstly, the processing of data packets comprising plaintext will be described with reference to FIGS. 10A to 10E. In these Figures, state information is shown being loaded and unloaded from state stores 1040, 1050. This state information is shown as being state information used for implementing AES-GCM. However, in other cases, where different block cipher encryption schemes are used, the state information may take different forms.

Figure 10A:
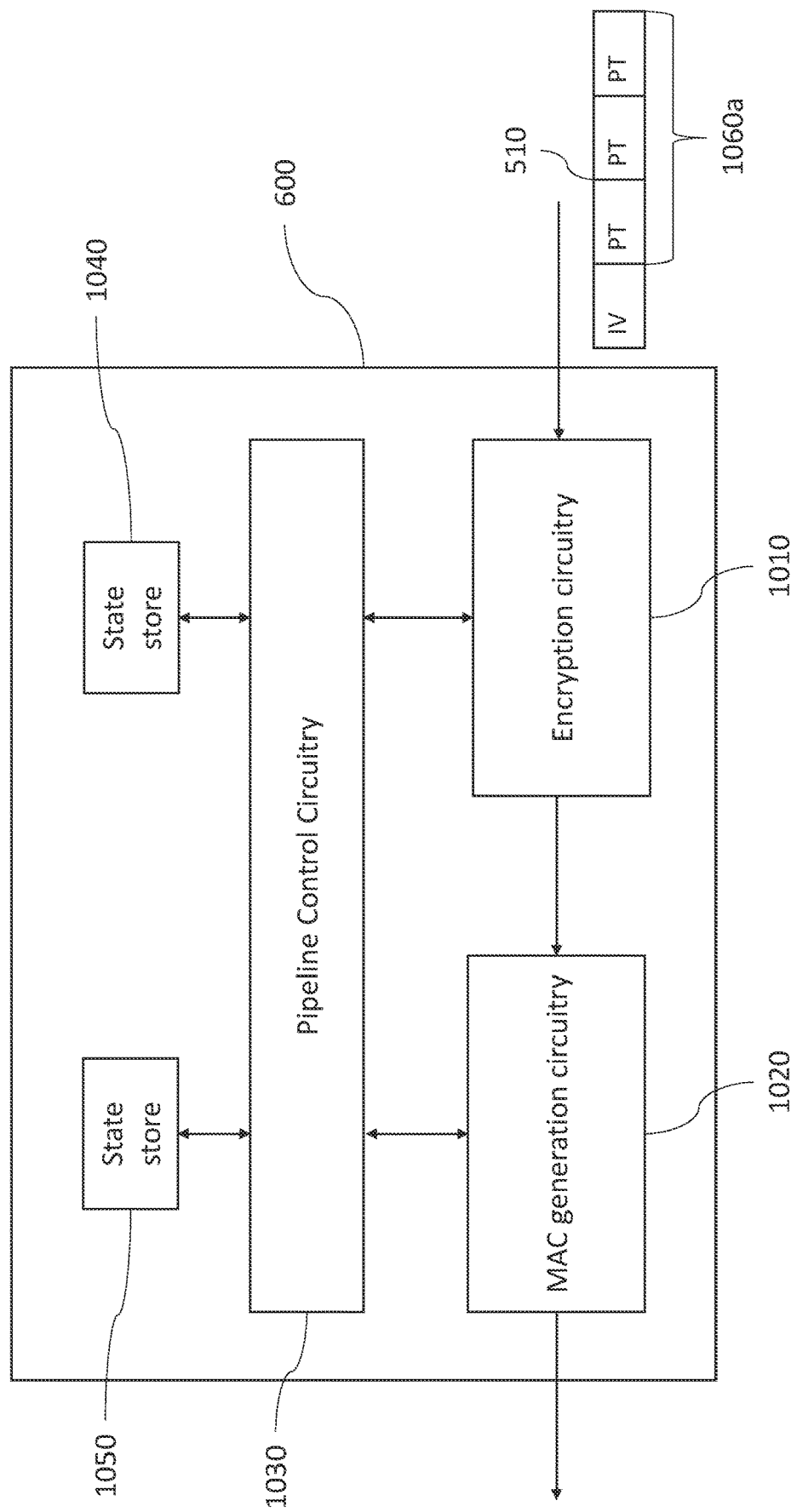
FIG. 10A illustrates reception of a first data packet at an encryption device.

Reference is made to FIG. 10A, which shows different components of the encryption device 600. The encryption device 600 comprises encryption circuitry 1010 for encrypting plaintext blocks to produce ciphertext blocks. These encryption operations represent a first stage in the pipeline. The encryption device 600 comprises MAC generation circuitry 1020 for performing authentication operations to generate a message authentication code for the encryption frame. These authentication operations represent a second stage in the pipeline.

The encryption device 600 comprises distinct and separate state stores 1040, 1050 for storing state information used for the processing performed in the pipeline. The state store 1040 stores state information that is required by the encryption circuitry 1010 for performing the encryption operations for the encryption frame. The state store 1050 stores state information that is required by the MAC generation circuitry 1020 for performing authentication operations to generate the MAC for the encryption frame. The state store 1040 is located proximate to the encryption circuitry to enable fast look up of the state information when required for encryption processing. The state store 1050 is located proximate to the MAC generation circuitry 1020 to enable fast look up of the state information when required for MAC generation processing.

The encryption device 600 comprises pipeline control circuitry 1030 for controlling the delivery of data between elements within the encryption device 600. The pipeline control circuitry 1030 provides plaintext blocks for processing at the encryption circuitry 1010, provides ciphertext blocks to the MAC generation circuitry 1020 for generating the MAC, and controls the loading of state from the state stores 1040, 1050 and the saving of state to these state stores 1040, 1050.

The encryption device 600 receives a first data packet 510, including one or more plaintext blocks. The first data packet 510 further includes part of an IV value, as discussed above with reference to FIG. 6, The encryption device 500 includes processing circuitry (not shown in FIG. 10A) for unpacking the plaintext blocks and the IV from the first data packet. The pipeline control circuitry 1030 supplies the plaintext blocks to the encryption circuitry for processing.

Figure 10B:
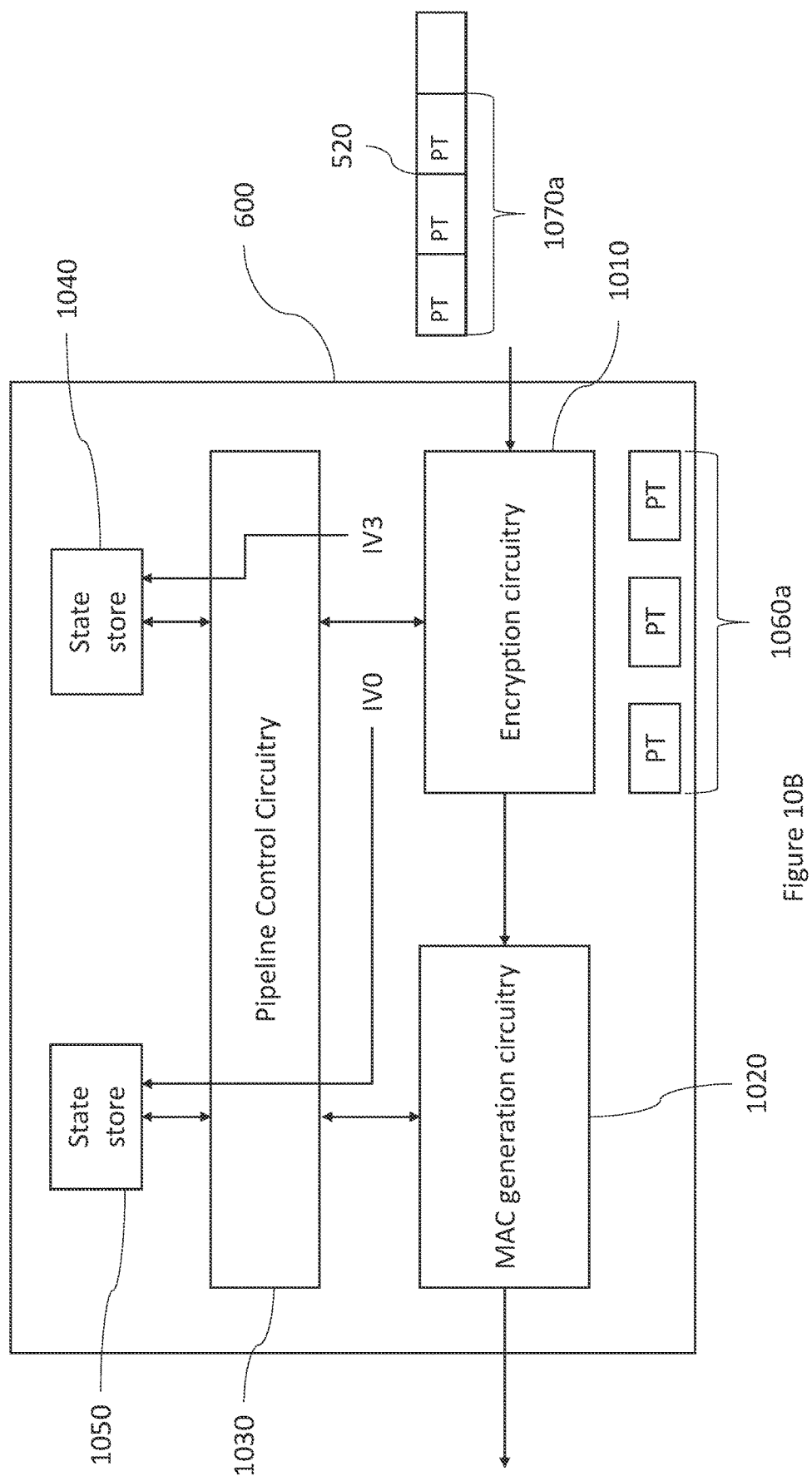
FIG. 10C illustrates authentication processing for data extracted from a first data packet and encryption processing of data extracted from the second data packet.
FIG. 10D illustrates authentication processing for data extracted from a second data packet and transmission of a processed first data packet.
FIG. 10E illustrates transmission of a processed second data packet.

Reference is made to FIG. 10B, which shows that plaintext blocks 1060a at a stage in the pipeline at which they are processed by the encryption circuitry 1010. The encryption circuitry 1010 encrypts these blocks to produce ciphertext blocks. The encryption circuitry 1010 may generate the ciphertext blocks using the algorithm described above with respect to FIGS. 5 and 8 or using a different block cipher encryption scheme. As part of the processing, the encryption circuitry 1010 generates state information for performing authentication operations for generating the MAC. In embodiments, this state information is an initialisation vector, and may be the IV0 value discussed above with respect to FIG. 8. However, in some embodiments, the state information may not be IV0 itself but may be a value associated with IV0 that can be used to derive the encrypted from of IV0 needed for performing the operation at S890 shown in FIG. 8. The pipeline control circuitry 1030 stores the generated state information in state store 1050.

As part of the encryption operations, the encryption circuitry 1010 generates an updated version of the initialisation vector by incrementing the counter value as described above with respect to steps S815, S850 of FIG. 8. FIG. 8 only shows the two different values of the IV (IV1 and IV2) that are used to encrypt plaintext blocks. Since there are three plaintext blocks shown in FIG. 10B, the IV will be incremented three times. The resulting IV from performing the incrementation operation on IV0 three times is shown in FIG. 10B as IV3. The value, IV3, is used to encrypt the last of the plaintext blocks 1060a that are processed by the encryption circuitry 1010. The pipeline control circuitry 1030 causes the value of IV3 to be stored in the state store 1040.

Reference is made to FIG. 10B, which illustrates a second data packet 520, which will be received at the encryption device 600 after receipt of the first data packet 510, and during processing by the encryption device 600 of the data extracted from the first data packet 510. When the second data packet 520 is received at the encryption device 600, the encryption processing by the encryption circuitry 1010 may be being performed with respect to data from the first data packet 510 and/or the authentication operations may be being performed with respect to data from the first data packet 510, When the second data packet 520 is received at the encryption device 600, processing circuitry (not shown in FIG. 10B) unpacks the plaintext blocks in the second data packet 520.

Figure 10C:
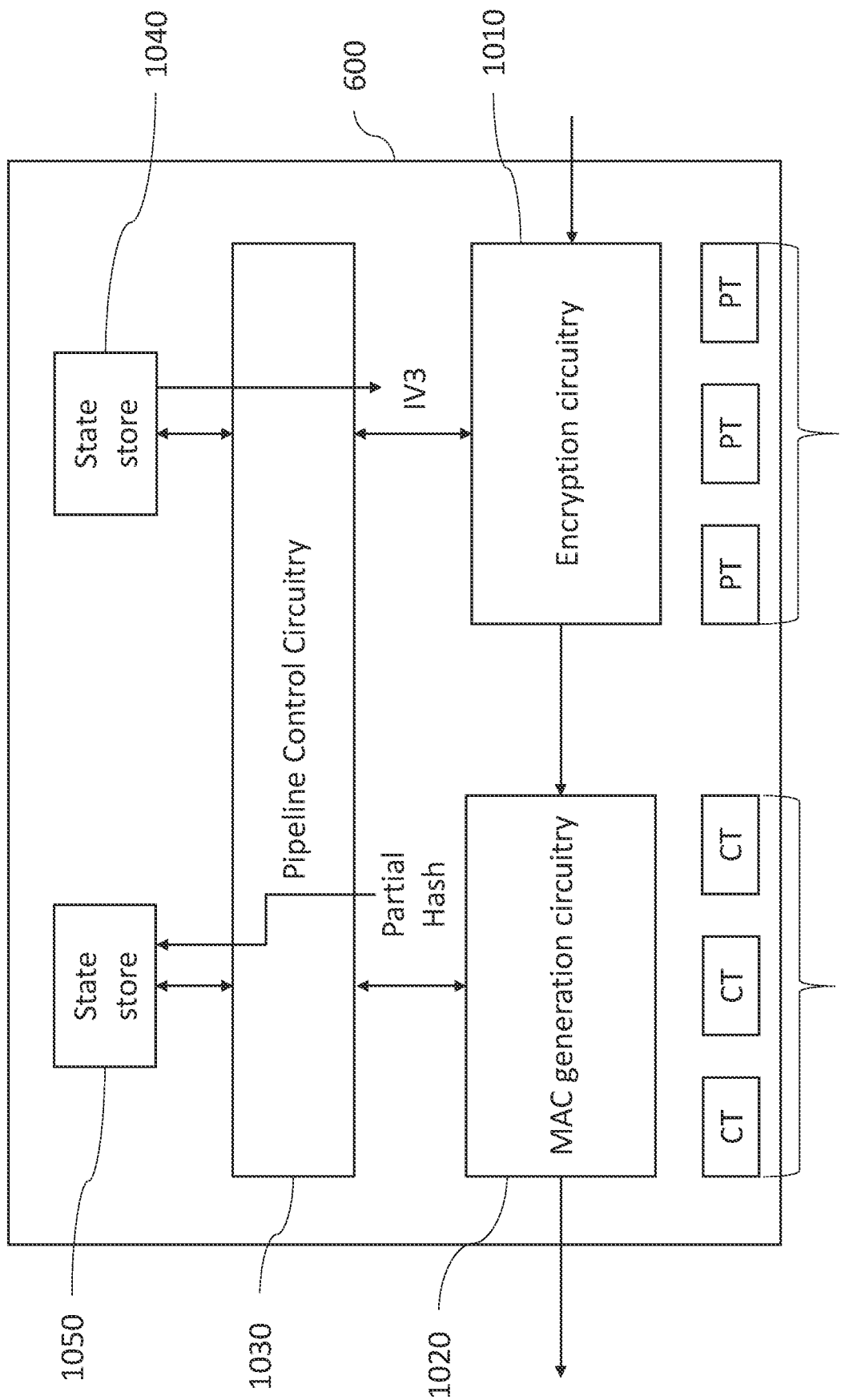

Reference is made to FIG. 10C, which illustrates a later stage of the movement and processing of data through the encryption device 600. Prior to this stage, the plaintext blocks 1060a of data have been processed by the encryption circuitry 1010 to produce the ciphertext blocks 1060b. The MAC generation circuitry 1020 performs authentication operations to generate the message authentication code for the encryption frame. These operations comprise updating a partial hash for each of the ciphertext blocks 1060b. Each of the ciphertext blocks 1060b is updated by performing the relevant operation shown in FIG. 8. For example, the partial hash generated by the first of the ciphertext blocks 1060b that is processed by the circuitry 1020 may be generated in the same manner as partial hash 845 shown in FIG. 8. Similarly, the partial hash generated by the second of the ciphertext blocks 1060b that is processed by the circuitry 1020 may be generated in the same manner as partial hash 870 shown in FIG. 8. The partial hash generated from the final one of the ciphertext blocks 1060b processed by the MAC generation circuitry 1020 constitutes part of the state information for generating the MAC. The pipeline control circuitry 1030 causes this state information to be stored in the state store 1050.

At the same time that the circuitry 1020 is performing the authentication operations with respect to one or more of the ciphertext blocks 1060b, as is also illustrated in FIG. 10C, the encryption circuitry 1010 performs encryption operations on the plaintext blocks 1070a to generate ciphertext blocks. In order to perform these operations it is necessary to use the appropriate initialisation vector. The pipeline control circuitry 1030 retrieves the IV value (IV3) that was used to encrypt the last of the plaintext blocks 1060a of the first data packet 510. The pipeline control circuitry 1030 supplies this IV value to the encryption circuitry 1010. The encryption circuitry 1010 uses this IV value to encrypt each of the plaintext blocks 1070a. The encryption circuitry 1010 increments the IV value between encrypting each of the plaintext blocks 1070a.

In this way, the encryption device 600 simultaneously processes the data of both data packets 510, 520. The provision of separate state stores 1040, 1050 prevents the device 600 from stalling before processing the data of packet 520, which may occur if only a single state store were provided. The provision of separate state stores 1040, 1050 allows different packets of the same encryption frame to be processed simultaneously. Furthermore, the separation of the state information permits rapid (i.e. just in time) look up of relevant state information when required for processing.

Figure 10D:
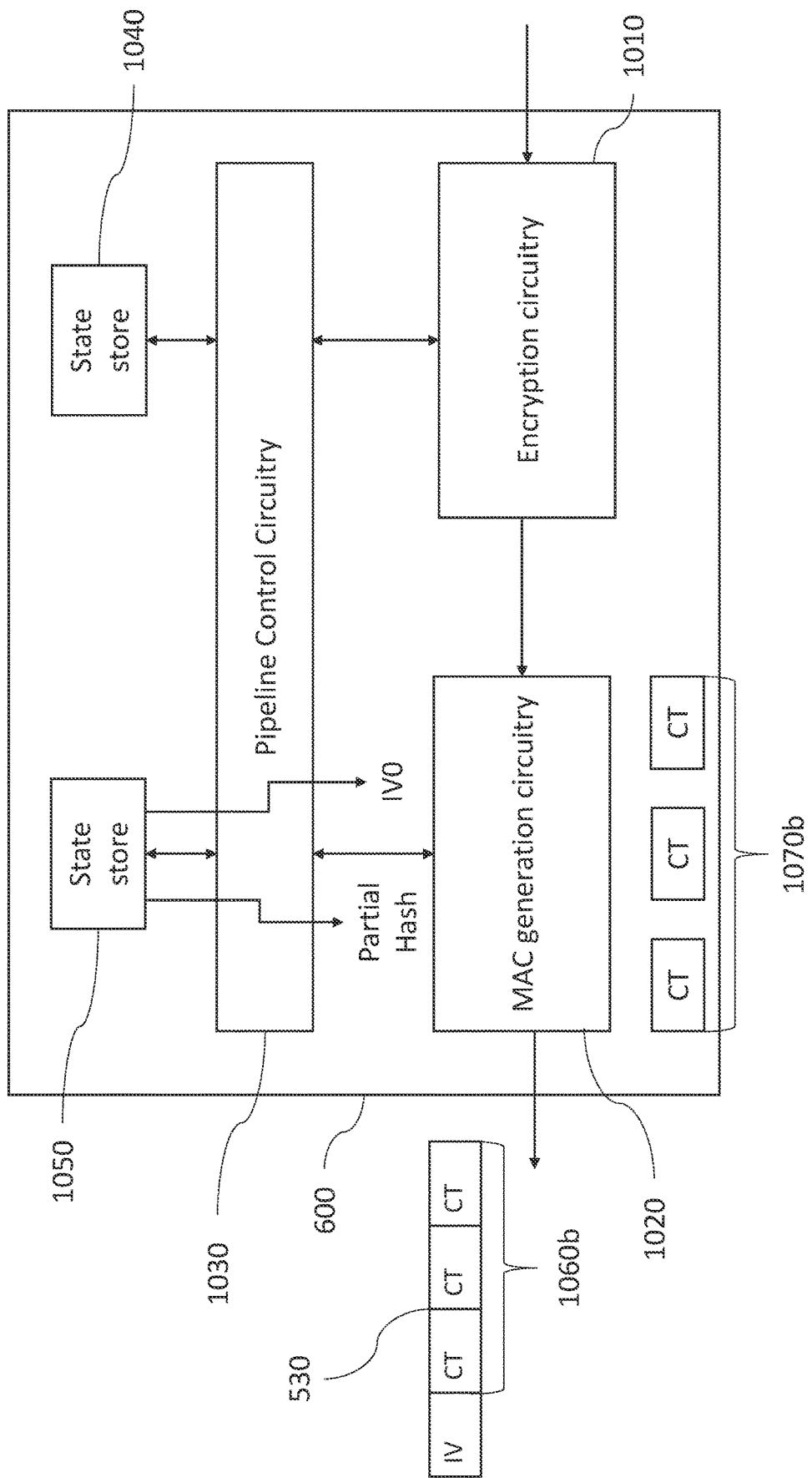

Reference is made to FIG. 10D, which illustrates a stage of processing the encryption frame after which the processing to produce data packet 530 is complete. After the processing performed by the device 600 with respect to ciphertext blocks is complete, processing circuitry (not shown in FIG. 10D) of the device 600 packetises the ciphertext blocks and the IV to produce data packet 530, which is dispatched from the device 600.

The MAC generation circuitry 1020 receives the ciphertext blocks 1070b, which are produced by the encryption circuitry 1010 encrypting the plaintext blocks 1070a. The MAC generation circuitry 1020 performs the authentication processing for these blocks 1070b to generate the MAC. In order to so, the circuitry 1020 uses state information that was stored when the data from the first data packet 510 was processed. In embodiments, this state information includes the partial hash generated in dependence upon the ciphertext blocks 1060b. The state information may also includes the value of IV0 that was produced by the encryption circuitry 1010 from the IV value included in the first data packet 510.

The circuitry 1020 updates the partial hash loaded from the state store 1050 in dependence upon the ciphertext blocks 1070b. Once the partial hash has been generated in dependence upon the last in sequence of the ciphertext blocks 1070b, the circuitry 1020 is configured to finalise the MAC value. As shown in FIG. 8 this may include using an encrypted form of the value of IV0 in an XOR operation (shown at S890) to produce the MAC 895.

Reference is made to FIG. 10E, which illustrates that after the ciphertext blocks 1070b have been produced by the circuitry 1010, and after the MAC has been finalised by the circuitry 1020, the fourth data packet 540 containing these elements is produced and dispatched by processing circuitry of the device 600.

In the example described with reference to FIG. 10A to 10E, the encryption frame described comprises only two different data packets 510, 520. However, in embodiments, there may be more than two data packets in the encryption frame, with the processing performed for the intermediate data packets (i.e. those received between the first data packet 510 and second data packet 520) of the frame also involving the loading and storing of state information of the encryption frame to/from state store 1040, 1050.

The processing of data packets comprising ciphertext will now be described with reference to FIGS. 11A to 11E, In these Figures, state information is shown being loaded and unloaded from state stores 1140, 1150. This state information is shown as being state information used for implementing AES-GCM. However, in other cases, where different block cipher encryption schemes are used, the state information may take different forms.

Figure 11A:
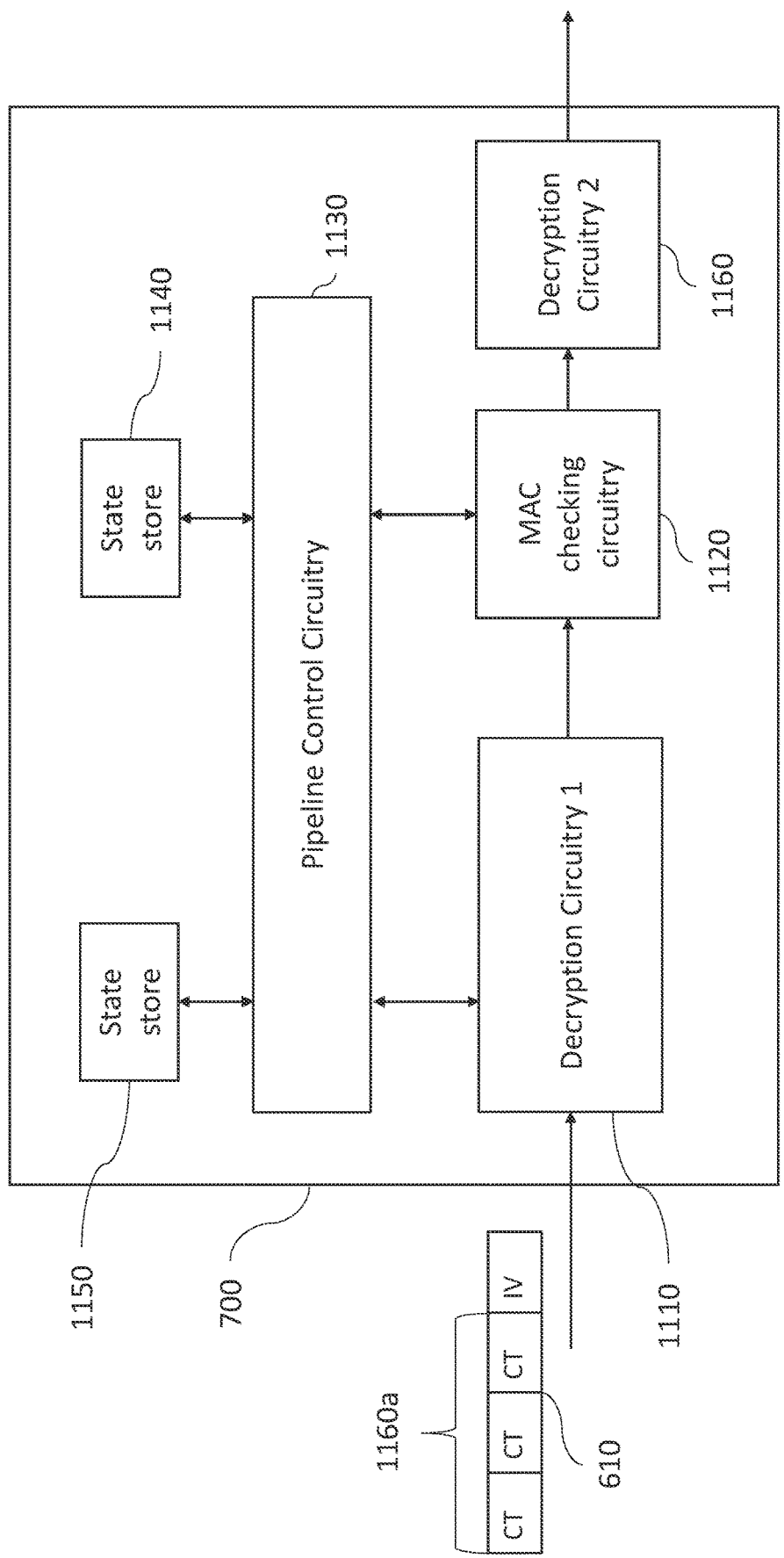
FIG. 11A illustrates reception of a first data packet at a decryption device.

Reference is made to FIG. 11A, which shows different components of the decryption device 700. In some embodiments, the encryption device 600 and decryption device 700 may be provided together in a single unit. In other embodiments, they may be provided separately. The decryption device 700 comprises MAC checking circuitry 1120 for performing authentication operations to generate a message authentication code for the encryption frame. The MAC checking circuitry 1120 uses the generated MAC to check that a MAC received with the ciphertext data is correct.

The decryption processing is split across two stages in the device 700. The decryption device 700 comprise a first decryption circuitry 1110 configured to perform a first set of decryption operations to generate the encrypted IVs that are used by the second decryption circuitry 1160 to generate the plaintext from the ciphertext.

The operations performed by the first decryption circuitry 1110 represent a first stage in the pipeline, whereas the authentication operations performed by the MAC checking circuitry 1120 represent a second stage in the pipeline.

The decryption device 700 comprises distinct and separate state stores 1140, 1150 for storing state information used for the processing performed in the pipeline. The state store 1140 stores state information that is required by the decryption circuitry 1110 for performing its operations that are part of the process of decrypting the ciphertext of the encryption frame. The state store 1150 stores state information that is required by the MAC checking circuitry 1120 for performing authentication operations to generate and check the MAC for the encryption frame. The state store 1140 is located proximate to the decryption circuitry 1110 to enable fast look up of the state information when required for the processing by that circuitry 1110. The state store 1150 is located proximate to the MAC checking circuitry 1120 to enable fast look up of the state information when required for the authentication processing.

The decryption device 700 comprises pipeline control circuitry 1130 for controlling the delivery of data between elements within the decryption device 700. The pipeline control circuitry 1130, provides ciphertext blocks for the decryption processing at the decryption circuitry 1110 and the decryption circuitry 1130, provides the same ciphertext blocks to the MAC generation circuitry 1120 for generating the MAC, and controls the loading of state from the state stores 1140, 1150 and the saving of state to these state stores 1140, 1150.

The decryption device 700 receives a first data packet 610, including one or more ciphertext blocks 1160a. The first data packet 610 further includes part of an IV value, as discussed above with reference to FIG. 7. The decryption device 700 includes processing circuitry (not shown in FIG. 11A) for unpacking the ciphertext blocks and the partial IV from the first data packet 610. The pipeline control circuitry 1130 supplies the partial IV to the decryption circuitry 1110 for processing.

Figure 11B:
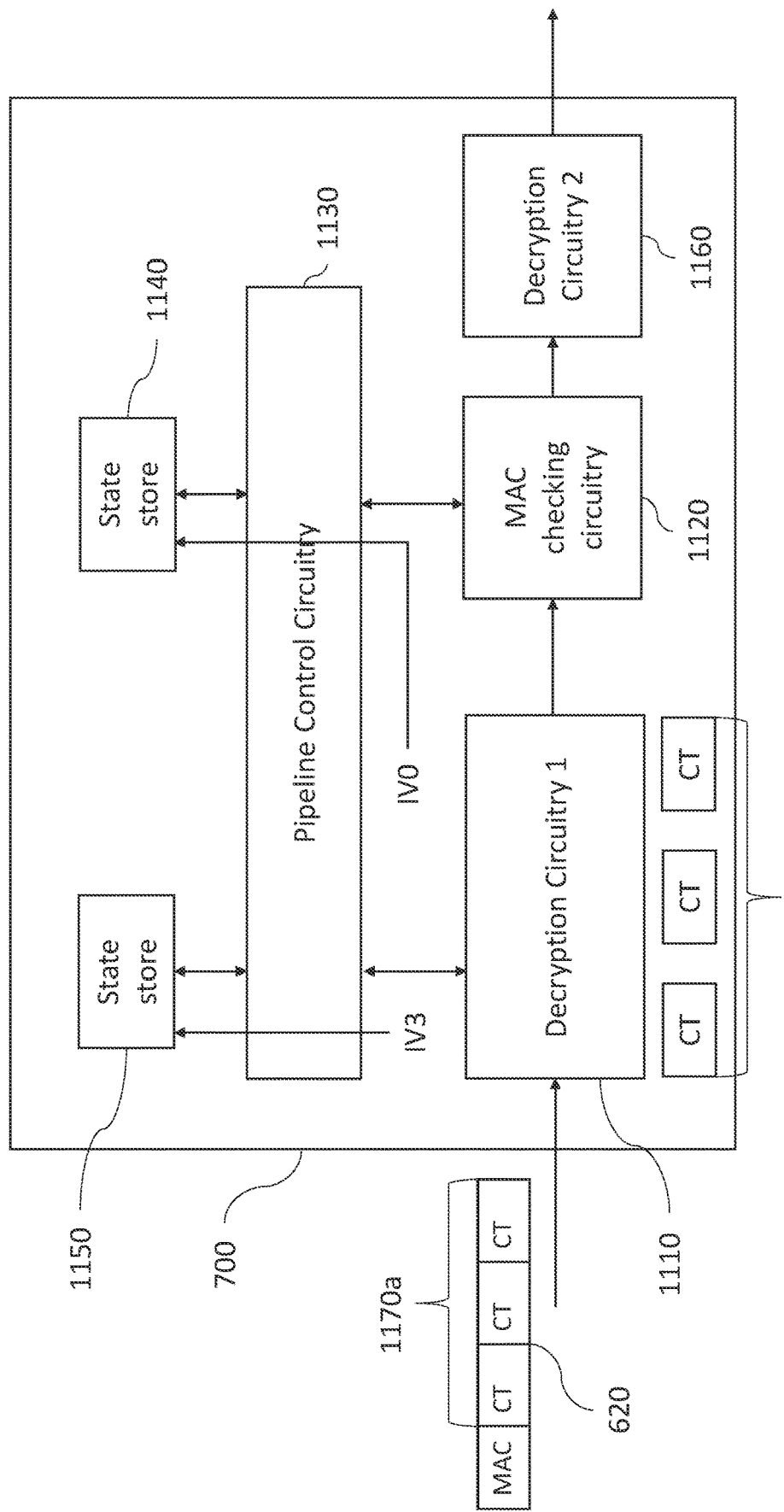
FIG. 11B illustrates decryption processing for data extracted from a first data packet and reception of a second data packet at the decryption device.

Reference is made to FIG. 11B, which shows the ciphertext blocks 1160a at a stage in the pipeline at which processing is performed by the decryption circuitry 1110 with respect to the data extracted from packet 610. This processing includes appending an initial counter value to the partial IV from the packet 610 to form the initial IV (IV0). The circuitry 1110 encrypts the IV0 value, with this encrypted IV0 value being provided to the state store 1140 associated with the MAC checking circuitry 1120 for use in subsequent authentication operations for generating the MAC.

Figure 11C:
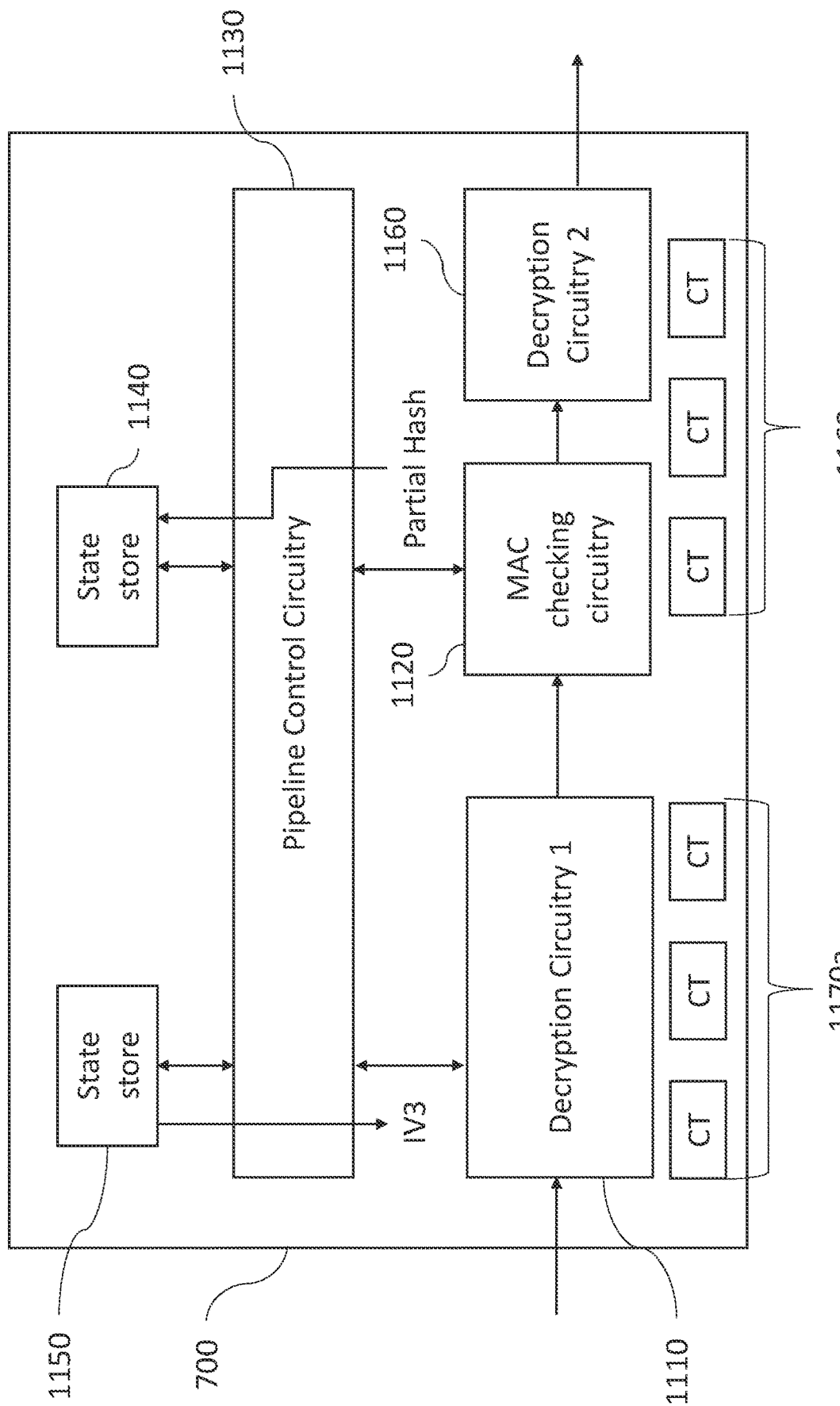
FIG. 11C illustrates decryption processing for data extracted from the second data packet and is authentication processing for data from the first data packet.

The processing performed by the circuitry 1110 with respect to each of the ciphertext blocks 1160a includes incrementing the IV value (starting from IV0) once for each of those ciphertext block 1160a and encrypting each of the resulting IV values. Since there are three ciphertext blocks 1160a from packet 610, the IV will be incremented, and the result encrypted, three times. The IV resulting from performing the incrementation operation on IV0 three times is shown in FIG. 11C as 1\13. The pipeline control circuitry 1130 causes the value of IV3 to be stored in the state store 1150 associated with the decryption circuitry 1110.

The decryption circuitry 1110 comprises an encryption pipeline for performing operations for encrypting each of the IV values associated with each of the ciphertext blocks 1160a. The ciphertext blocks 1160a are provided to a later stage of the decryption device pipeline, i.e. to the MAC checking circuitry 1120, for authentication processing whilst the decryption circuitry 1110 generates the encrypted IVs to be used by the second decryption circuitry 1160 for generating the plaintext blocks from the ciphertext blocks 1160a.

FIG. 11B also shows a second data packet 620, which is received at the decryption device 700 after receipt of the first data packet 610, and during processing by the decryption device 700 of the data extracted from the first data packet 610. When the second data packet 620 is received at the decryption device 700, processing circuitry (not shown in FIG. 11B) unpacks the ciphertext blocks 1170a from the second data packet 620.

Reference is made to FIG. 11C, in which it is shown that the pipeline control circuitry 1130 supplies the ciphertext blocks 1160a to the MAC checking circuitry 1120 for the authentication operations to be performed by that circuitry 1120. These operations comprise updating a partial hash for each of the ciphertext blocks 1160a. Each of the updates comprises performing the relevant operation shown in FIG. 9. For example, the partial hash generated by the first of the ciphertext blocks 1160a that is processed by the circuitry 1120 may be generated in the same manner as partial hash 845 shown in FIG. 9. Similarly, the partial hash generated by the second of the ciphertext blocks 1160a that is processed by the circuitry 1120 may be generated in the same manner as partial hash 870 shown in FIG. 9. The partial hash generated from the final one of the ciphertext blocks 1160a processed by the MAC generation circuitry 1120 constitutes part of the state information for generating the MAC that is to be stored and retrieved when a next data packet of the same encryption frame is received. As shown in FIG. 11C, the pipeline control circuitry 1130 causes this state information to be stored in the state store 1140.

Once the authentication processing has been performed for each of the ciphertext blocks 1160a, each such block is provided to the second decryption circuitry 1160. The second decryption circuitry 1160 XORs each of the ciphertext blocks 1160a with its corresponding encrypted IV generated by the circuitry 1110 to generate plaintext blocks from each of the ciphertext blocks 1160a.

At the same time that the circuitry 1120 is performing the authentication operations with respect to one or more of the ciphertext blocks 1160a, as is also illustrated in FIG. 11C, the circuitry 1110 performs operations for generating the encrypted Ns to be used for decrypting each of the ciphertext blocks 1170a. The circuitry 1110 may perform these operation at the same time that circuitry 1160 performs the decryption operations with respect to one or more of the ciphertext blocks 1160a, To enable the circuitry 1110 to performs these operations, the pipeline control circuitry 1130 loads the state information (i.e. the value of IV3) from the state store 1150, where that state resulted from the processing performed by circuitry 1110 with respect to the ciphertext blocks 1060a. This state information comprises the most recent value of IV (1V3), The circuitry 1110 increments the value of IV3 once for each of the ciphertext blocks 1170a in the data packet 620. Since there are three ciphertext blocks 1170a, the circuitry 1110 increments the value of the IV, three times. The circuitry 1110 encrypts each value of the IV generated when incrementing the IV for each of the ciphertext blocks 1170a to generate an encrypted IV value for each of the ciphertext blocks 1170a to be used for decrypting those ciphertext blocks 1170a.

In this way, the decryption device 700 simultaneously processes the data of both data packets 610, 620. The provision of separate state stores 1140, 1150 prevents the device 700 from stalling before processing the data of packet 620, which may occur if only a single state store were provided. The provision of separate state stores 1140, 1150 allows different packets of the same encryption frame to be processed simultaneously. Furthermore, the separation of the state information permits rapid (i.e. just in time) look up of relevant state information when required for processing.

After the processing performed by the device 500 with respect to ciphertext blocks 1150a is complete, processing circuitry (not shown in FIG. 11C) of the device 500 packetises the resulting plaintext blocks 1160b and the IV to produce data packet 630, which is to be dispatched from the device 700.

Figure 11D:
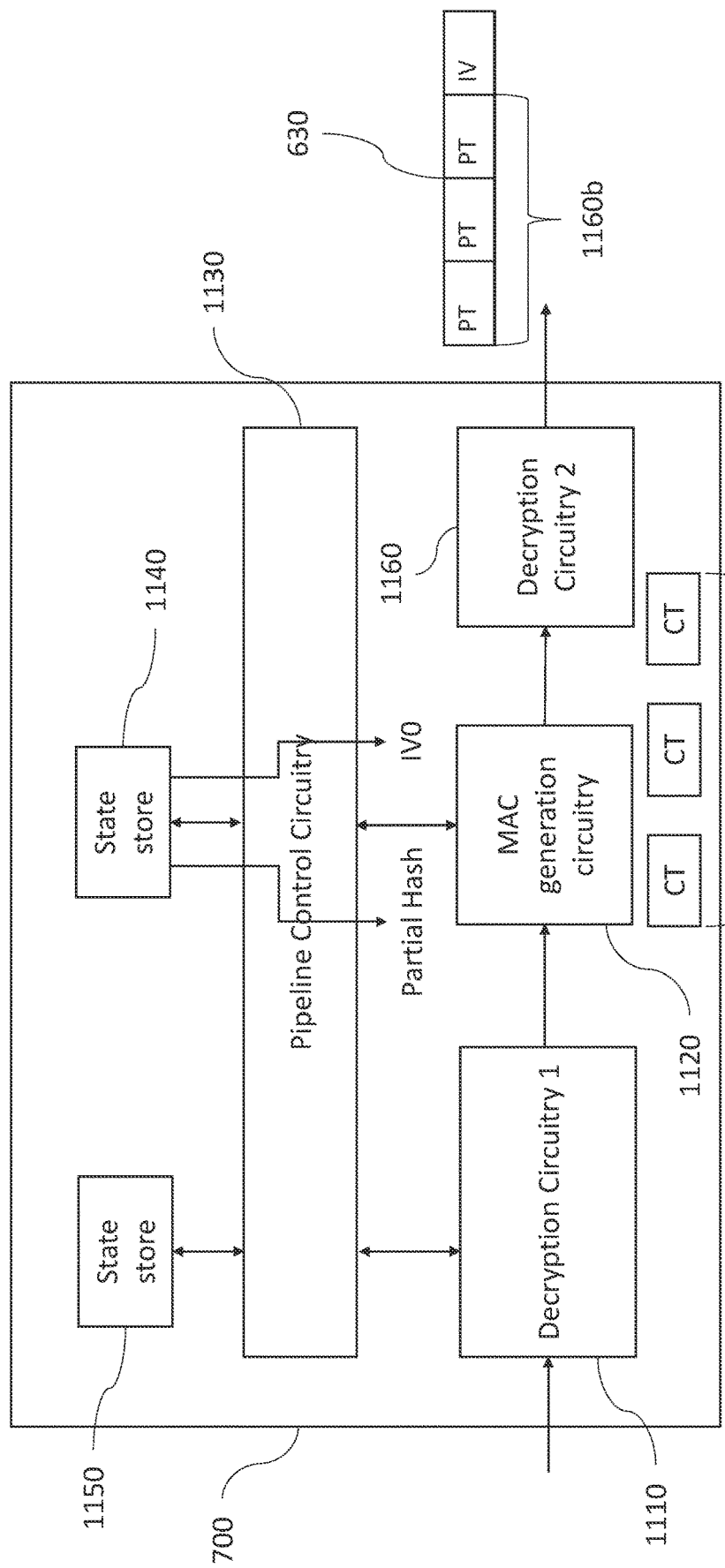
FIG. 11D illustrates authentication processing for data extracted from the second data packet and transmission of a processed first data packet.

Reference is made to FIG. 11D, which illustrates stage at which the MAC generation circuitry 1120 performs the authentication processing for the ciphertext blocks 1170a to generate the MAC. In order to so, the circuitry 1120 uses state information that was stored when the data from the first data packet 610 was processed. This state information includes the partial hash generated in dependence upon the ciphertext blocks 1160a. The state information also includes the encrypted value of IV0 that was generated by circuitry 1110. The pipeline control circuitry 1130 retrieves this state information from state store 1140 and provides the state information to circuitry 1120. The circuitry 1120 updates the partial hash for each of the ciphertext blocks 1170a in turn and then completes the MAC using the encrypted value of IV0 in the XOR operation at S895 shown in FIG. 9.

After generating the MAC, the circuitry 1120 checks that the generated MAC matches the MAC contained in the received second data packet 620. If the MACs match, the pipeline control circuitry 1130 causes the ciphertext blocks 1170a to be provided to the circuitry 1160 to be decrypted such that the data of these blocks will be forwarded from the device 700 in packet 640. If however, the MACs do not match, the ciphertext blocks 1170a are dropped, such that complete transmission of the encryption frame through the device 700 fails.

Figure 11E:
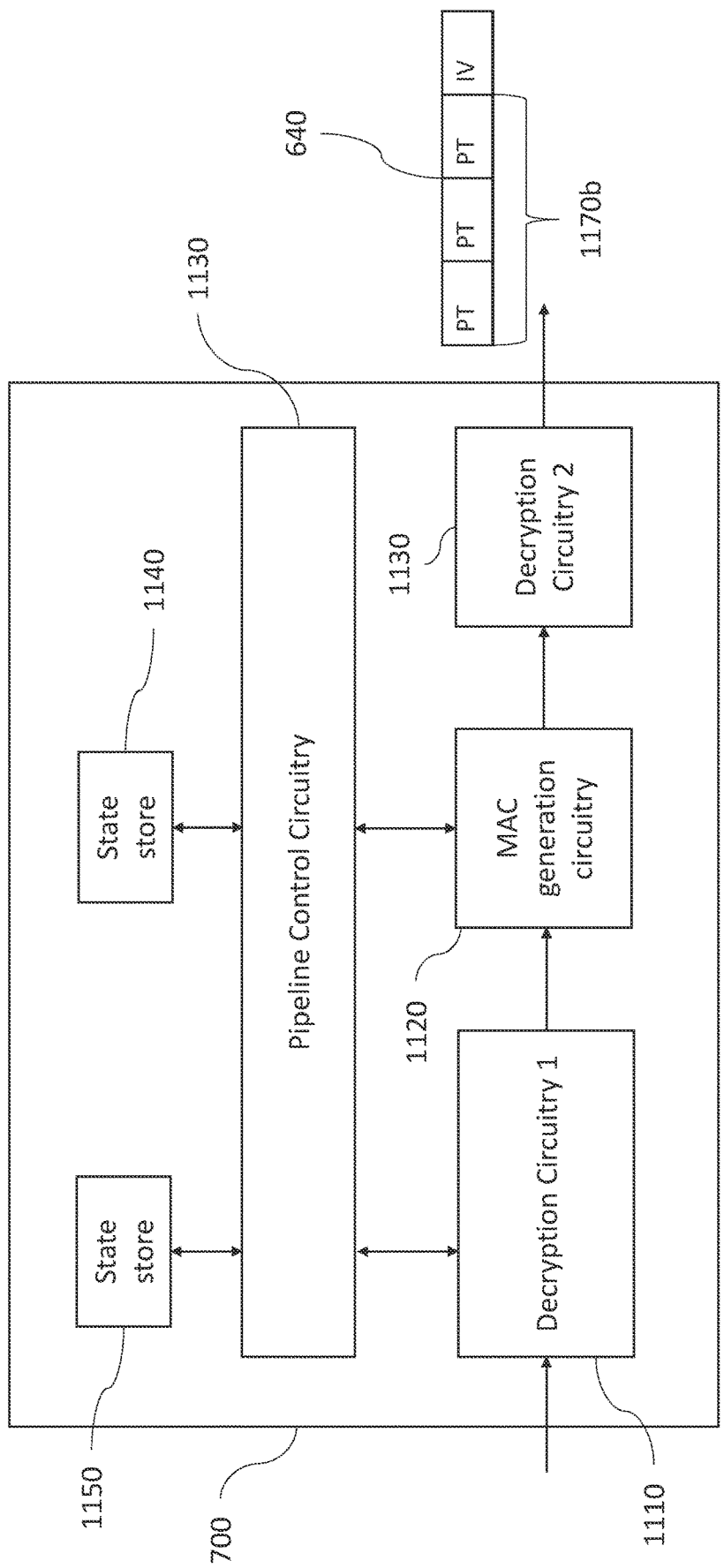
FIG. 11E illustrates transmission of a processed second data packet.

Reference is made to FIG. 11E, which illustrates that after the plaintext blocks 1170b have been produced by the circuitry 1110, the fourth data packet 640 containing these elements is produced and dispatched by processing circuitry of the device 700.

In the example described with reference to FIG. 1.1A to HE, the encryption frame described comprises only two different data packets 610, 620. However, in embodiments, there may be more than two data packets in the encryption frame, with the processing performed for the intermediate data packets (i.e. those received between the first data packet 610 and second data packet 620) of the frame also involving the loading and storing of state information of the encryption frame to/frame state stores 1140, 1150.

In some embodiments, the encryption/decryption devices 600, 700 may process a single encryption frame at a time. However, in other embodiments, data packets belonging to different encryption frames may be interleaved. In this case, the state stores 1040, 1050, 1140, 1150 are configured to store state information associated with multiple different encryption frames. When a data packet of a different encryption frame is received at the device 600/700, state information relating to that encryption frame is loaded from state stores 1040, 1050 or state stores 1140, 1150 for processing.

Figure 12A:
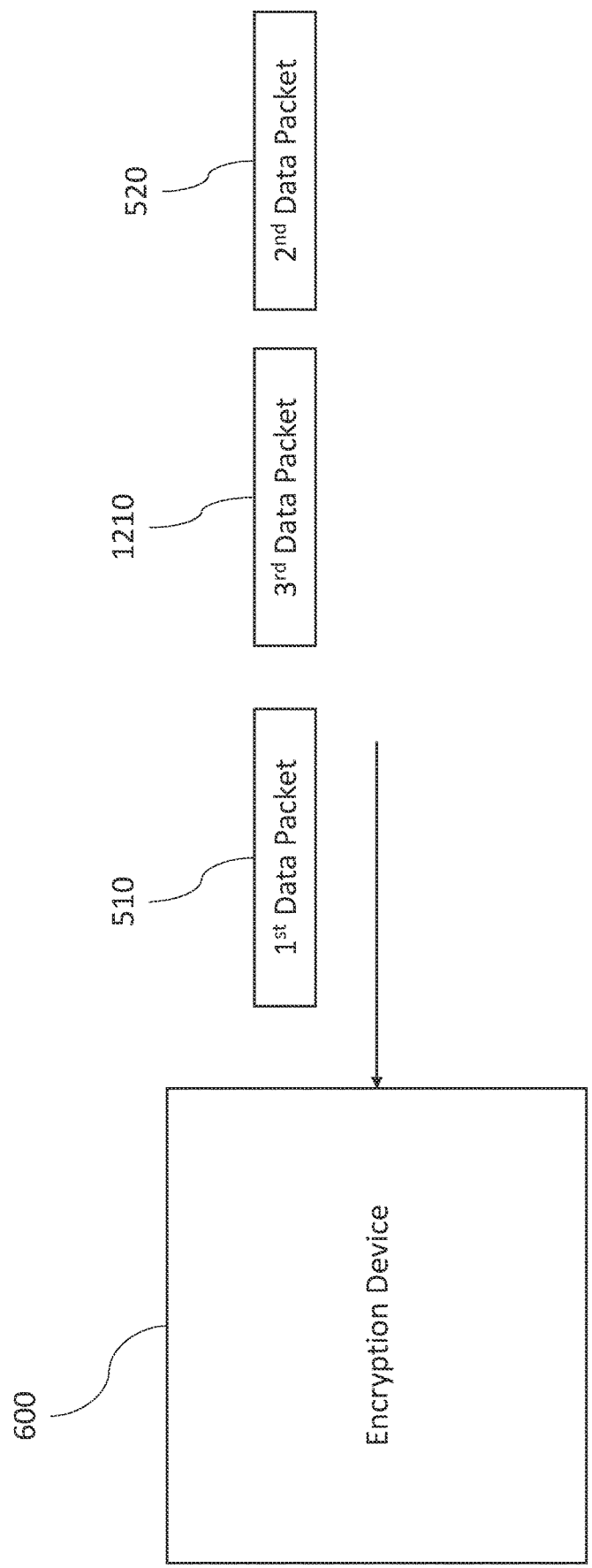
FIG. 12A illustrates interleaved data packets of different encryption frames received and processed at an encryption device.

Reference is made to FIG. 12A, which illustrates an example of the reception of interleaved data packets at an encryption device. A first data packet and second packet as shown may be received at the encryption device 600 for processing. In embodiments, the first data packet is the data packet 510 discussed above with reference to earlier Figures. Similarly, in embodiments, the second data packet is the data packet 520 discussed above with reference to earlier Figures. After receipt of the first data packet 510, and prior to receipt of the second data packet 520, a third data packet 1210 is received at the encryption device 600. The third data packet 1210 belongs to a different encryption frame, and therefore state information associated with this frame is saved and/or loaded from the state stores 1040, 1050 by the pipeline control circuitry 1030 when the third data packet 1210 is processed by the circuitry 1010, 1020 of the encryption device 600.

Figure 12B:
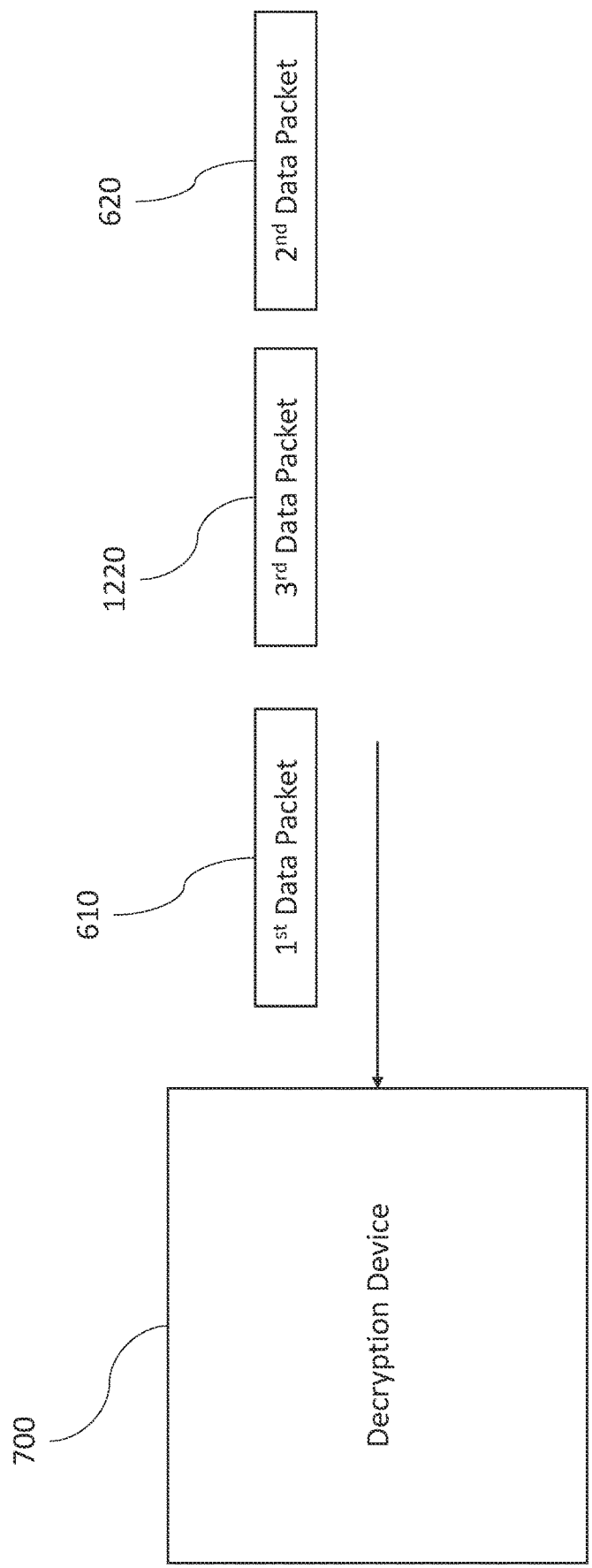
FIG. 12B illustrates interleaved data packets of different encryption frames received and processed at a decryption device.

Reference is made to FIG. 12B, which illustrates an example of the reception of interleaved data packets at a decryption device 700. A first data packet 610 and second data packet 620 as shown may be received at the decryption device 700 for processing. In embodiments, the first data packet is the data packet 610 discussed above with reference to earlier Figures. Similarly, in embodiments, the second data packet is the data packet 620 discussed above with reference to earlier Figures. After receipt of the first data packet 610, and prior to receipt of the second data packet 620, a third data packet 1220 is received at the decryption device 700. The third data packet 1220 belongs to a different encryption frame, and therefore state information associated with this frame is saved and/or loaded from the state stores 1140, 1150 by the pipeline control circuitry 1130 when the third data packet is processed by the circuitry 1110, 1120 of the decryption device 700.

The interleaving of data packets from different encryption frames may occur in a multi-tile processor as show in FIGS. 3 and 4. For example, FIG. 3 shows different write requests 140 being issued by different tiles 4. Each of the tiles 4 shown issuing write requests 140 may issue those write requests 140 belonging to different encryption frames. Therefore, if the write requests 140 issued by one tile 4 are interleaved with the write requests 140 issued by another tile 4 when they are received at the SXP 730, then interleaving of data packets may occur in manner illustrated in FIG. 12A. Each of the write requests 140 is processed by the SXP 730 in the manner described above with respect to FIGS. 10A to 10E.

FIG. 4 shows different read completions 42 being returned to different tiles 4. Each of the tiles 4 shown may receive read completions belonging to different encryption frames. Therefore, if the read completions 42 directed to one tile 4 are interleaved with the read completions 42 directed to another tile 4 when they are received at the SXP 730, then interleaving of data packets may occur in manner illustrated in FIG. 12B. Each of the read completions 42 is processed by the SXP 730 in the manner described with respect to FIGS. 11A to 11E.

In some embodiments, the processing pipeline 1030, 1130 may be implemented in hardware, e.g. using an FPGA or ASIC. In other embodiments, the processing pipeline may comprise a processor for executing computer readable instructions stored on a non-transitory computer readable medium.

Figure 13:
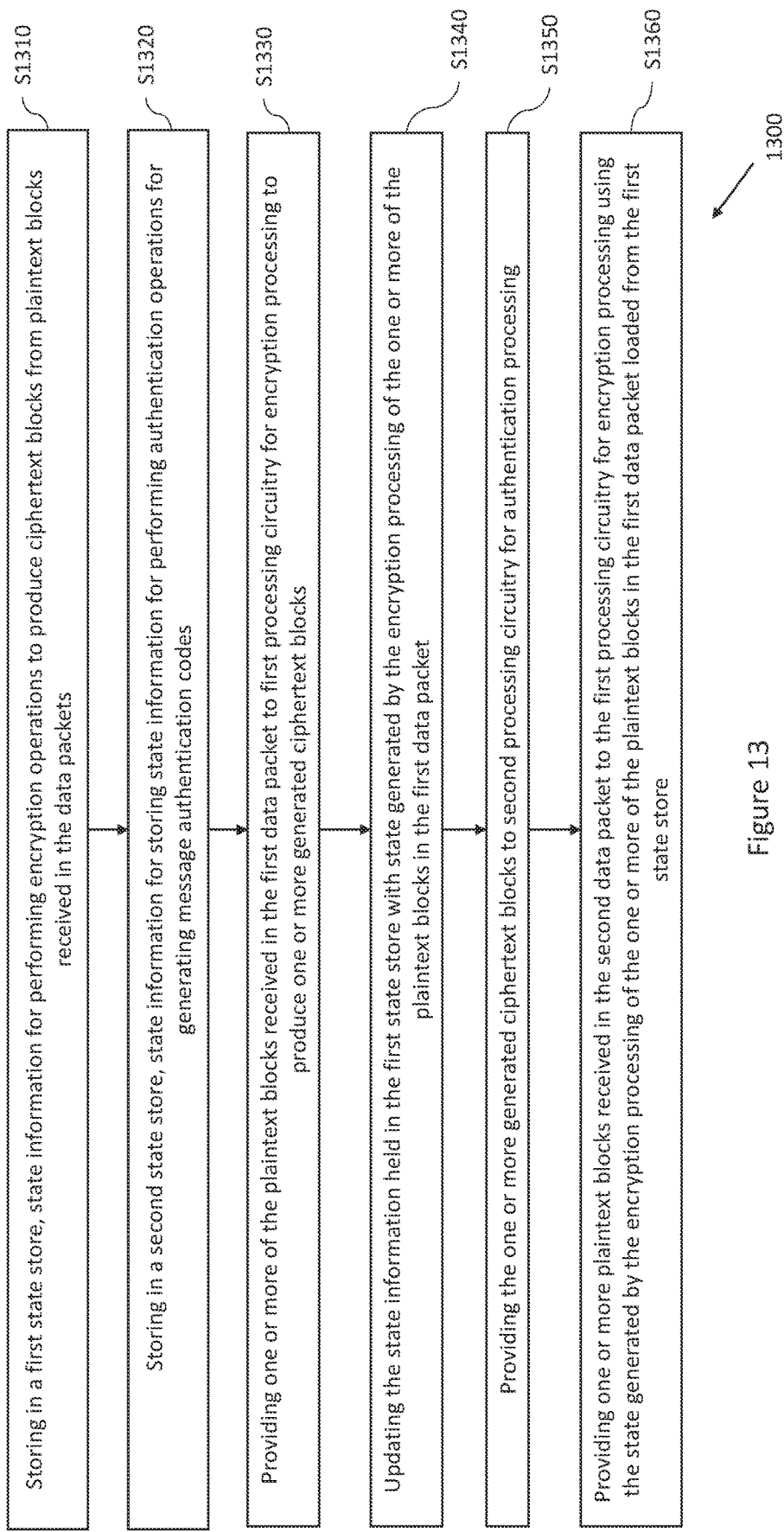
FIG. 13 illustrates a method for encrypting data in accordance with a block cipher encryption scheme.

Reference is made to FIG. 13, which illustrates an example method 1300 implemented in the encryption device 600. The method may be implemented by execution of a computer program by a processor. The computer program may be stored on a non-transitory computer readable medium.

At S1310, state information for performing encryption operations to produce ciphertext blocks from plaintext blocks received in the data packets is stored in a first state store.

At S1320, the state information for storing state information for performing authentication operations for generating message authentication codes is stored in the second state store.

At S1330, one or more of the plaintext blocks received in the first data packet are provided to first processing circuitry for encryption processing to produce one or more generated ciphertext blocks.

At S1340, the state information held in the first state store is updated with state generated by the encryption processing of the one or more of the plaintext blocks in the first data packet.

At S1350, the one or more generated ciphertext blocks are provided to second processing circuitry for authentication processing.

At S1360, the one or more plaintext blocks received in the second data packet are provided to the first processing circuitry for encryption processing using the state generated by the encryption processing of the one or more of the plaintext blocks in the first data packet loaded from the first state store.

Figure 14:
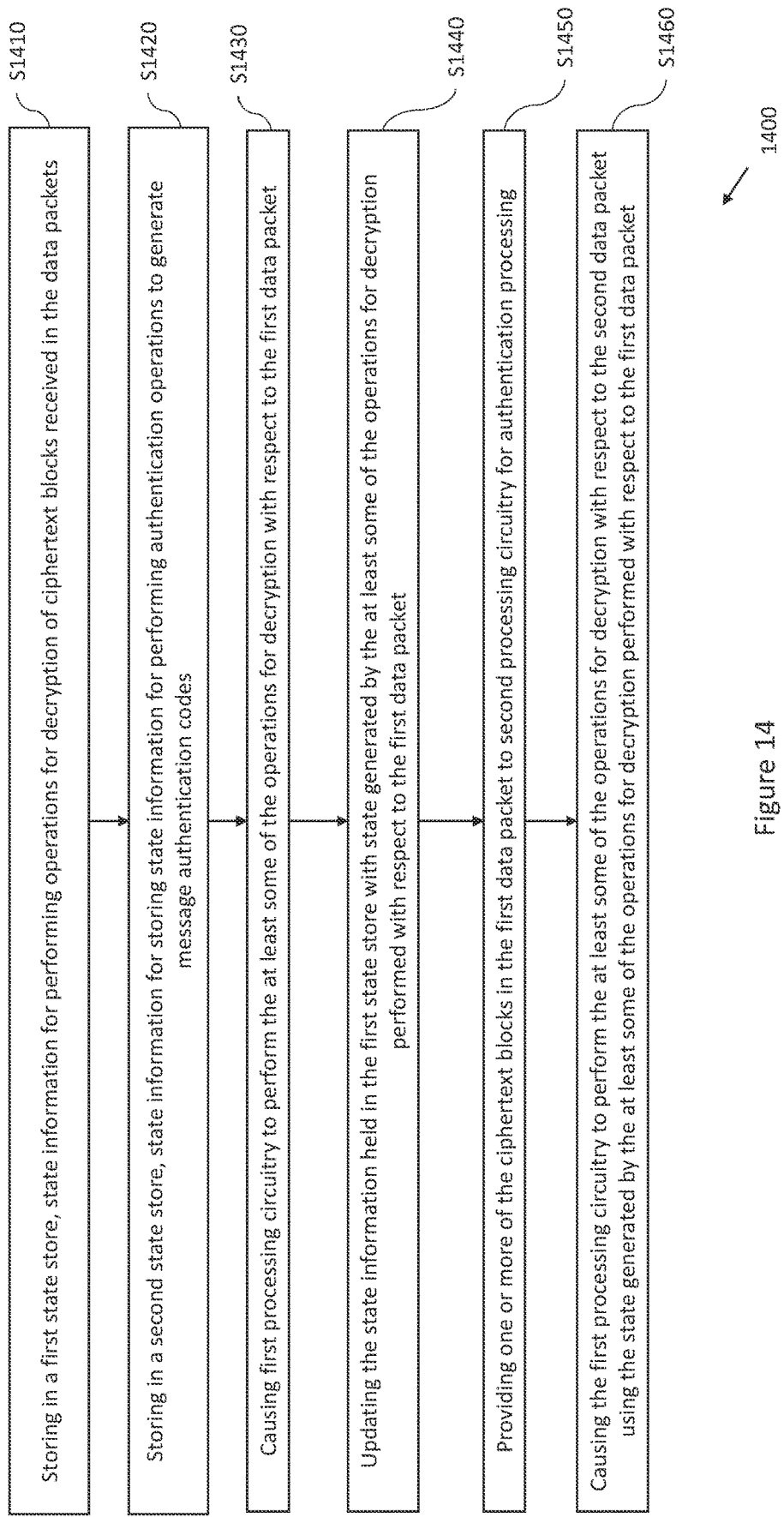
FIG. 14 illustrates a method for decrypting data in accordance with a block cipher encryption scheme.

Reference is made to FIG. 14, which illustrates an example method 1400 implemented in the encryption device 700. The method may be implemented by execution of a computer program by a processor. The computer program may be stored on a non-transitory computer readable medium.

At S1410, state information for performing operations for decryption of ciphertext blocks received in the data packets is stored in a first state store.

At S1420, state information for storing state information for performing authentication operations to generate message authentication codes is stored in a second state store.

At S1430, the first processing circuitry is caused to perform the at least some of the operations for decryption with respect to the first data packet.

At S1440, the state information held in the first state store is updated with state generated by the at least some of the operations for decryption performed with respect to the first data packet.

At S1450, one or more of the ciphertext blocks in the first data packet are provided to second processing circuitry for authentication processing.

At S1460, the first processing circuitry is caused to perform the at least some of the operations for decryption with respect to the second data packet using the state generated by the at least some of the operations for decryption performed with respect to the first data packet.

Embodiments have been described by way of example only.

The invention claimed is:

1. A device for performing operations to implement a block cipher encryption scheme for encryption of data received at the device, the data including:
    a first encryption frame comprising a plurality of data packets each comprising a respective memory write request issued by a first processing device to an external storage device, the first encryption frame comprising:
        a first data packet comprising a first memory write request issued by the first processing device; and
        a second data packet comprising a second memory write request issued by the first processing device, the device providing a processing pipeline comprising:
a first state store for storing state information for performing encryption operations to produce ciphertext blocks from plaintext blocks received in the data packets;
a second state store for storing state information for performing authentication operations for generating message authentication codes;
first processing circuitry configured to perform the encryption operations;
second processing circuitry configured to perform the authentication operations to generate a message authentication code for the first encryption frame; and
pipeline control circuitry configured to:
in response to receipt at the device of the first data packet belonging to the first encryption frame, provide one or more of the plaintext blocks received in the first data packet to the first processing circuitry for encryption processing to produce one or more first generated ciphertext blocks;
update the state information held in the first state store with state generated by the encryption processing of the one or more of the plaintext blocks in the first data packet;
provide the one or more first generated ciphertext blocks to the second processing circuitry for authentication processing;
update state information held in the second state store with state generated by the authentication processing of the one or more of the first generated ciphertext blocks;
in response to receipt at the device of the second data packet belonging to the first encryption frame, provide one or more plaintext blocks received in the second data packet to the first processing circuitry for encryption processing to produce one or more second generated ciphertext blocks using the state generated by the encryption processing of the one or more of the plaintext blocks in the first data packet loaded from the first state store; and
provide the one or more second generated ciphertext blocks to the second processing circuitry for authentication processing to generate the message authentication code for the first encryption frame, using the state generated by the authentication processing of the one or more of the first generated ciphertext blocks,
wherein at least some of the authentication processing performed with respect to the one or more generated ciphertext blocks is performed simultaneously to the encryption processing of the one or more of the plaintext blocks in the second data packet.

2. A device as claimed in claim 1, wherein the first state store stores different sets of state information for different encryption frames, wherein the second state store stores different sets of state information for different encryption frames.

3. A device as claimed in claim 2, wherein the pipeline control circuitry is configured to:
in response to receipt at the device of a third data packet belonging to a second encryption frame, provide one or more of the plaintext blocks in the third data packet for encryption processing to produce one or more third generated ciphertext blocks; and
update state information associated with the second encryption frame, and held in the first state store, with state generated by the encryption processing of the one or more of the plaintext blocks in the third data packet.

4. A device as claimed in claim 3, wherein the third data packet is received at the device after the first data packet, but prior to the second data packet.

5. A device as claimed in claim 1, wherein the state information for performing the encryption operations comprises state associated with an initialisation vector used for performing the block cipher encryption operations.

6. A device as claimed in claim 5, wherein the encryption processing to produce the one or more first generated ciphertext blocks comprises updating the initialisation vector for each of the one or more first generated ciphertext blocks,
wherein the updating of state information held in the first state store with state generated by the encryption processing of the one or more of the plaintext blocks in the first data packet comprises updating the state associated with the initialisation vector with a most recent value of the initialisation vector following the encryption processing of the one or more of the plaintext blocks in the first data packet.

7. A device as claimed in claim 1, wherein the updating the state information held in the second state store comprises storing in the second state store a partial hash generated from the authentication processing of the one or more first generated ciphertext blocks.

8. A device as claimed in claim 1, wherein the state information for performing the authentication operations comprises state associated with an initialisation vector for finalising the message authentication code.

9. A device as claimed in claim 1, wherein the pipeline control circuitry is configured to update the state information held in the second state store with state generated by the first processing circuitry.

10. A device as claimed in claim 9, wherein the step of updating the state information held in the second state store with state generated by the first processing circuitry comprises:
storing in the second state store, the state associated with an initialisation vector for finalising a message authentication code.

11. A device for performing operations to implement a block cipher encryption scheme for decryption of data received at the device, the data including:
a first encryption frame comprising a plurality of data packets each comprising a respective memory read completion issued by an external storage device in response to a read request issued by a first processing device, the first encryption frame comprising:
a first data packet comprising a first memory read completion in response to a first read request issued by the first processing device; and
a second data packet comprising a second memory read completion in response to the first read request issued by the first processing device;
the device providing a processing pipeline comprising:
a first state store for storing state information for performing operations for decryption of ciphertext blocks received in the data packets;
a second state store for storing state information for performing authentication operations to generate message authentication codes;
first processing circuitry configured to perform at least some of the operations for decryption;

second processing circuitry configured to perform the authentication operations to generate a message authentication code for the first encryption frame;

pipeline control circuitry configured to:
- in response to receipt at the device of the first data packet belonging to the first encryption frame, cause the first processing circuitry to perform the at least some of the operations for decryption with respect to the first data packet;
- update the state information held in the first state store with state generated by the at least some of the operations for decryption performed with respect to the first data packet;
- provide one or more of the ciphertext blocks in the first data packet to the second processing circuitry for authentication processing;
- update the state information held in the second state store with state generated by the authentication processing of the one or more of the ciphertext blocks in the first data packet;
- in response to receipt at the device of the second data packet belonging to the first encryption frame, cause the first processing circuitry to perform the at least some of the operations for decryption with respect to the second data packet using the state generated by the at least some of the operations for decryption performed with respect to the first data packet; and
- provide one or more of the ciphertext blocks in the second data packet to the second processing circuitry for authentication processing to generate the message authentication code for the first encryption frame, using the state generated by the authentication processing of the one or more of the ciphertext blocks in the first data packet,
- wherein the at least some of the operations for decryption performed with respect to the second data packet are performed simultaneously with the authentication processing performed for the one or more of ciphertext blocks in the first data packet.

12. A device as claimed in claim 11, wherein the first state store stores different sets of state information for different encryption frames, wherein the second state store stores different sets of state information for different encryption frames.

13. A device as claimed in claim 12, wherein the pipeline control circuitry is configured to:
- in response to receipt at the device of a third data packet belonging to a second encryption frame, cause the first processing circuitry to perform the at least some of the operations for decryption with respect to the third data packet; and
- update state information associated with the second encryption frame, and held in the first state store, with state generated by the at least some of the operations for decryption performed with respect to the third data packet.

14. A device as claimed in claim 13, wherein the third data packet is received at the device after the first data packet, but prior to the second data packet.

15. A device as claimed in claim 11, wherein the state information for performing the operations for decryption comprises state associated with an initialisation vector used for performing the block cipher encryption operations.

16. A device as claimed in claim 15, wherein the at least some of the operations for decryption performed with respect to the first data packet comprise updating the initialisation vector for each of the one or more ciphertext blocks in the first data packet,
- wherein the updating the state information held in the first state store comprises updating the state associated with the initialisation vector with a most recent value of the initialisation following the at least some of the operations for decryption performed with respect to the first data packet.

17. A device as claimed in claim 11, wherein the state information for performing the authentication operations comprises a partial hash generated from the authentication processing of the one or more ciphertext blocks received in the first data packet.

18. A device as claimed in claim 11, wherein the state information for performing the authentication operations comprises an encrypted initialisation vector for finalising a message authentication code for the first encryption frame.

19. A device as claimed in claim 11, wherein the device comprises third processing circuitry configured to, for each of the one or more ciphertext blocks received in the first data packet, decrypt the respective ciphertext blocks using an encrypted initialisation vector generated by the first processing circuitry.

20. A method for performing operations to implement a block cipher encryption scheme for encryption of data received at a device, the data including:
- a first encryption frame comprising a plurality of data packets each comprising a respective memory write request issued by a first processing device to an external storage device, the first encryption frame comprising:
- a first data packet belonging to a first encryption frame comprising a first memory write request issued by the first processing device; and
- a second data packet belonging to the first encryption frame comprising a second memory write request issued by the first processing device, the method comprising:
- storing in a first state store, state information for performing encryption operations to produce ciphertext blocks from plaintext blocks received in the data packets;
- storing in a second state store, state information for storing state information for performing authentication operations for generating message authentication codes;
- in response to receipt at the device of the first data packet belonging to the first encryption frame, providing one or more of the plaintext blocks received in the first data packet to first processing circuitry for encryption processing to produce one or more first generated ciphertext blocks;
- updating the state information held in the first state store with state generated by the encryption processing of the one or more of the plaintext blocks in the first data packet;
- providing the one or more first generated ciphertext blocks to second processing circuitry for authentication processing to generate a message authentication code for the first encryption frame;
- updating the state information held in the second state store with state generated by the authentication processing of the one or more of the first generated ciphertext blocks;
- in response to receipt at the device of the second data packet belonging to the first encryption frame, providing one or more plaintext blocks received in the second data packet to the first processing circuitry for encryption processing to produce one or more second generated ciphertext blocks using the state generated by the encryption processing of the one or more of the plaintext blocks in the first data packet loaded from the first state store; and providing the one or more second generated ciphertext blocks to the second processing circuitry for authentication processing to generate the message authentication code for the first encryption frame, using the state generated by the authentication processing of the one or more of the first generated ciphertext blocks, wherein at least some of the authentication processing performed with respect to the one or more generated ciphertext blocks is performed simultaneously to the encryption processing of the one or more of the plaintext blocks in the second data packet.

21. A method for performing operations to implement a block cipher encryption scheme for decryption of data received at a device, the data including:

a first encryption frame comprising a plurality of data packets each comprising a respective memory read completion issued by an external storage device in response to a read request issued by a first processing device, the first encryption frame comprising:

a first data packet comprising a first memory read completion in response to a first read request issued by the first processing device; and a second data packet comprising a second memory read completion in response to the first read request issued by the first processing device, the method comprising:

storing in a first state store, state information for performing operations for decryption of ciphertext blocks received in the data packets;

storing in a second state store, state information for storing state information for performing authentication operations to generate message authentication codes;

in response to receipt at the device of the first data packet belonging to the first encryption frame, causing first processing circuitry to perform the at least some of the operations for decryption with respect to the first data packet;

updating the state information held in the first state store with state generated by the at least some of the operations for decryption performed with respect to the first data packet;

providing one or more of the ciphertext blocks in the first data packet to second processing circuitry for authentication processing to generate a message authentication code for the first encryption frame;

updating the state information held in the second state store with state generated by the authentication processing of the one or more of the ciphertext blocks in the first data packet;

in response to receipt at the device of the second data packet belonging to the first encryption frame, causing the first processing circuitry to perform the at least some of the operations for decryption with respect to the second data packet using the state generated by the at least some of the operations for decryption performed with respect to the first data packet; and providing one or more of the ciphertext blocks in the second data packet to the second processing circuitry for authentication processing to generate the message authentication code for the first encryption frame, using the state generated by the authentication processing of the one or more of the ciphertext blocks in the first data packet, wherein the at least some of the operations for decryption performed with respect to the second data packet are performed simultaneously with the authentication processing performed for the one or more of ciphertext blocks in the first data packet.

* * * * *